(12) United States Patent
Takahashi

(10) Patent No.: US 9,525,827 B2
(45) Date of Patent: Dec. 20, 2016

(54) IMAGING APPARATUS, IMAGE PROCESSING DEVICE, IMAGE PROCESSING METHOD, AND PROGRAM

(71) Applicant: Sony Corporation, Tokyo (JP)

(72) Inventor: Masahiro Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 243 days.

(21) Appl. No.: 14/327,027

(22) Filed: Jul. 9, 2014

(65) Prior Publication Data

US 2015/0049217 A1 Feb. 19, 2015

(30) Foreign Application Priority Data

Aug. 16, 2013 (JP) ................. 2013-169038

(51) Int. Cl.
| | |
|---|---|
| *G06K 9/34* | (2006.01) |
| *H04N 5/262* | (2006.01) |
| *H04N 5/232* | (2006.01) |
| *H04N 5/77* | (2006.01) |

(52) U.S. Cl.
CPC ........ *H04N 5/2621* (2013.01); *H04N 5/23293* (2013.01); *H04N 5/772* (2013.01); *H04N 5/23296* (2013.01)

(58) Field of Classification Search
USPC .. 382/173, 171, 190, 291; 345/620; 348/126, 208.6, 208.13, 231.99, 239, 348/333.03, 576, 578; 396/52
See application file for complete search history.

(56) References Cited

U.S. PATENT DOCUMENTS

| | | | | |
|---|---|---|---|---|
| 7,432,983 | B2 * | 10/2008 | Masukura ................ | H04N 7/16 345/620 |
| 7,782,362 | B2 * | 8/2010 | Oshima ................ | H04N 3/1575 348/208.13 |
| 8,208,017 | B2 * | 6/2012 | Oshima ................ | H04N 3/1575 348/126 |

FOREIGN PATENT DOCUMENTS

JP 2012-178705 9/2012

* cited by examiner

*Primary Examiner* — Anh Do

(74) *Attorney, Agent, or Firm* — Michael Best & Friedrich LLP

(57) ABSTRACT

An imaging apparatus includes a control unit which displays cutout positions of a start frame and an end frame on an object image which is displayed on a display unit, and sets frame setting information including the cutout positions of the start frame and the end frame, in which the control unit determines a cutout region of an image frame according to the frame setting information in each of a plurality of photographed images which are photographed continuously or intermittently, and executes image cutout processing according to determined information.

15 Claims, 20 Drawing Sheets

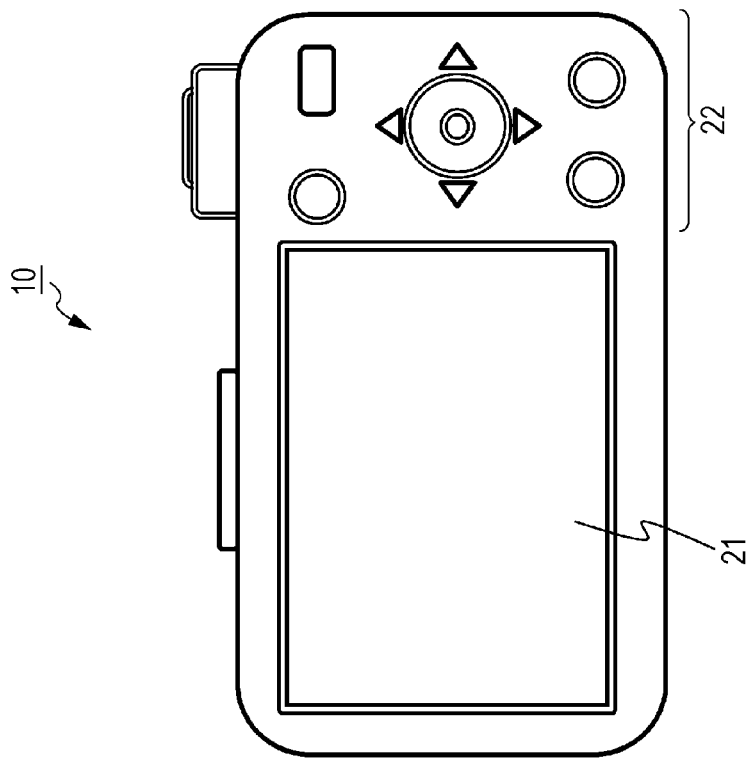
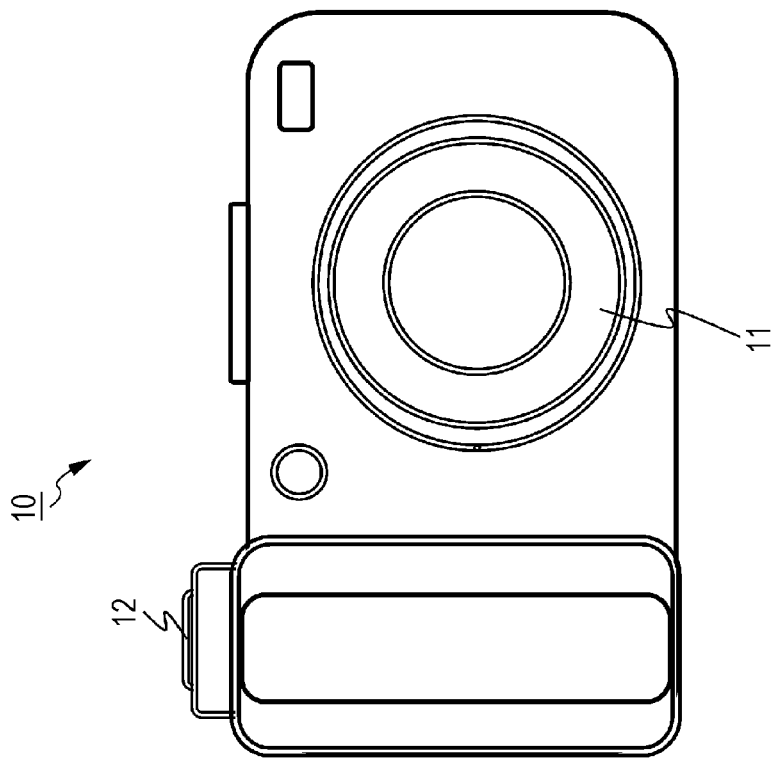

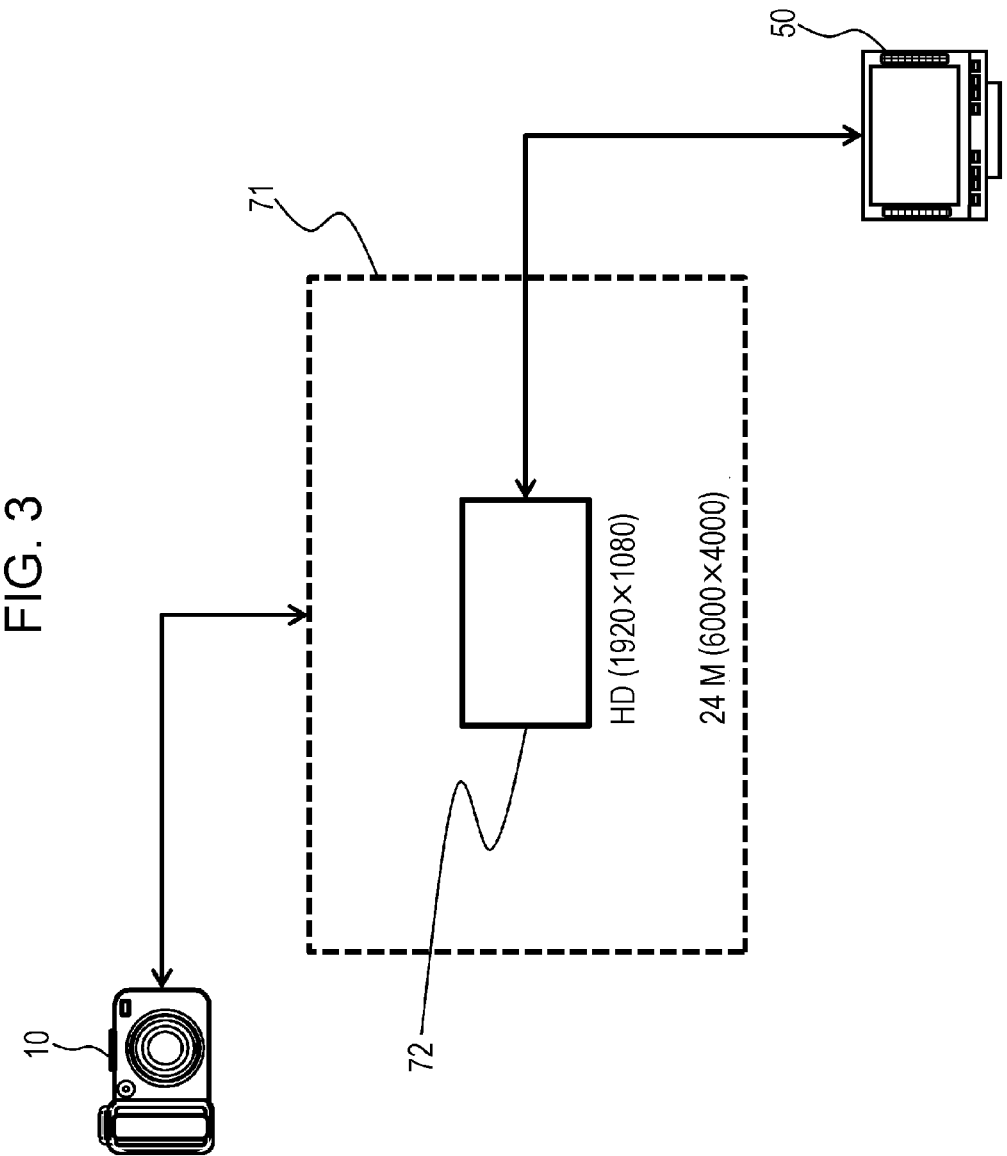

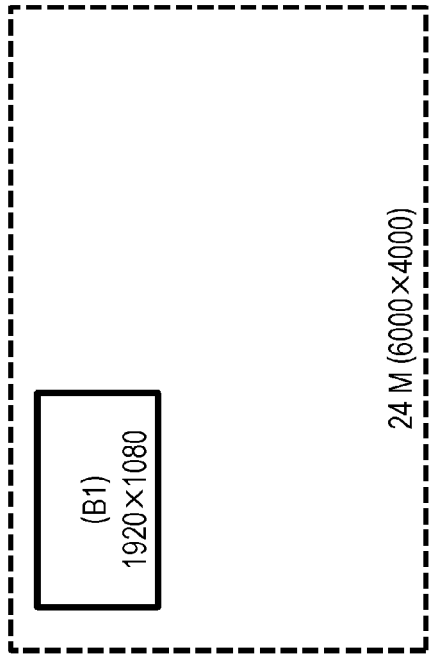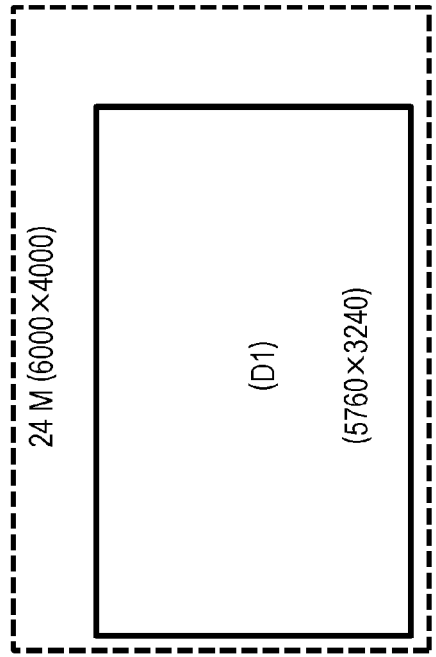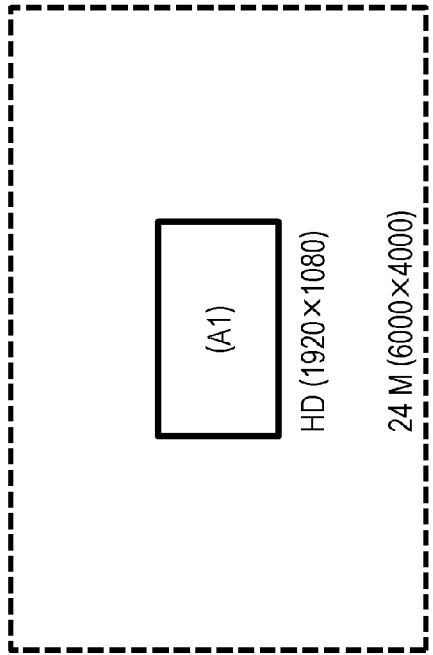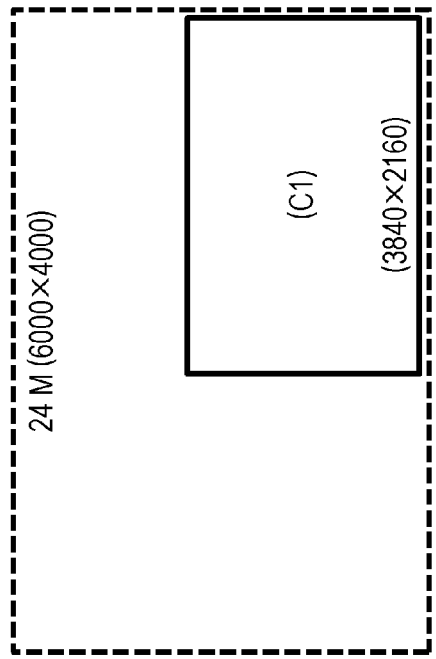

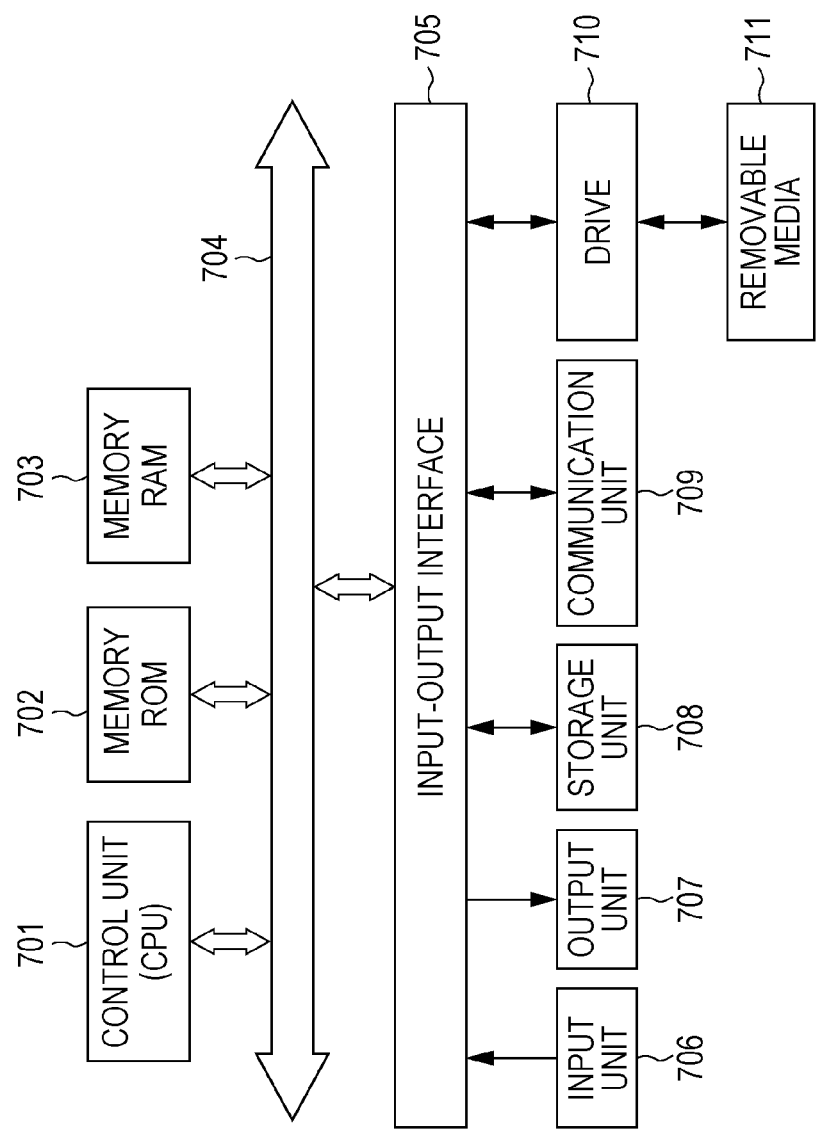

IMAGING APPARATUS, IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2013-169038 filed Aug. 16, 2013, the entire contents of which are incorporated herein by reference.

BACKGROUND

The present disclosure relates to an imaging apparatus, an image processing device, an image processing method, and a program. In particular, the present disclosure relates to an imaging apparatus an image processing device, an image processing method, and a program in which photographing control processing which is accompanied with setting of an angle, zooming, or the like, of a frame of each image when performing photographing of a moving image, or low speed photographing (time lapse), editing processing of a photographed image, or the like, is performed.

When performing moving image photographing or low speed (time lapse) photographing using a camera (imaging apparatus), a plurality of image frames are photographed continuously or intermittently from a photographing start frame to a photographing end frame.

In addition, low speed photographing is a process in which, for example, a still image is photographed for a certain period of time such as several minutes to several days, at a predetermined interval. Low speed photographing is also referred to as time lapse photographing. When low speed photographing is performed, it is possible to photograph a plurality of intermittent still images along with lapse of time. By reproducing these still images continuously, it is possible to view a long term motion of nature, or the like, such as motion of clouds, growth in plants, blooming of flowers, or the like, for example, as a moving image in a short time. In addition, low speed (time lapse) photographing is described in Japanese Unexamined Patent Application Publication No. 2012-178705, or the like, for example.

In such low speed photographing or moving image photographing, a plurality of image frames are continuously or intermittently photographed.

However, when performing photographing such as of blooming of flowers of plants or drifting of clouds, for example, there is a case in which a reproduced image becomes monotonous and boring when an angle or zooming of a camera is fixed from a starting point to an ending point of photographing.

For example, when blooming of flowers is subjected to low speed photographing, a powerful image is brought about when a photographing start image is set to an image which is slightly separated from flowers, and a series of last images of flowers which are blooming are set to zoomed-in images which are close-up images of the flowers. However, in order to perform such image photographing, it is necessary to perform processing such as sequential changing of camera settings in a photographing execution period.

In a case of a professional photographer, it is also possible to perform photographing which takes time and effort in this manner, however, such photographing is not easy for a general user.

SUMMARY

It is desirable to provide an imaging apparatus, an image processing device, an image processing method, and a program in which reducing of a burden on a user in a photographing control of setting a camera angle or zooming of an image frame, or the like, when performing moving image photographing or low speed (time lapse) photographing, or in an editing process of a photographed image is realized.

According to an embodiment of the present disclosure, there is provided an imaging apparatus which includes a control unit which displays cutout positions of a start frame and an end frame on an object image which is displayed on a display unit, and sets frame setting information including the cutout positions of the start frame and the end frame according to user input information, in which the control unit determines a cutout region of an image frame according to the frame setting information from each of a plurality of photographed images which are photographed continuously or intermittently, and executes image cutout processing according to determined information.

In the imaging apparatus, the frame setting information may include position and size information of the start frame and the end frame, and the control unit may determine a cutout region of an image frame with respect to each of photographed images by applying the position and size information of the start frame and the end frame, and may execute image cutout processing according to determined information.

In the imaging apparatus, the frame setting information may include track information between the start frame and the end frame, and the control unit may determine a cutout region of an image frame with respect to each of the photographed images by applying the track information between the start frame and the end frame, and may execute image cutout processing according to determined information.

In the imaging apparatus, the frame setting information may include movement speed information between the start frame and the end frame, and the control unit may determine a cutout region in an image frame with respect to each of photographed images by applying the movement speed information between the start frame and the end frame, and may execute image cutout processing according to determined information.

In the imaging apparatus, the control unit may execute image cutout processing according to the frame setting information in each of the photographed images, and may store the cutout image in a memory.

In the imaging apparatus, the control unit may execute image cutout processing in each of photographed images in each photographing process of images which are photographed continuously or intermittently, and may execute real time processing of storing the cutout image in the memory.

In the imaging apparatus, the control unit may perform batch processing in which the images stored in the memory after completing the image photographing process which is continuous or intermittent are sequentially read, image cutout processing in each photographed image is executed, and the cutout images are restored in the memory.

In the imaging apparatus, setting information which is input through an input unit may be stored in the memory, and the control unit may execute image cutout processing in each photographed image according to the setting information which is stored in the memory.

In the imaging apparatus, the control unit may execute information display processing in which frame setting at an arbitrary photographing timing is possible by displaying a time line which denotes a photographing timing of an image on the display unit, and setting an instruction mark on the time line.

In the imaging apparatus, the control unit may display a plurality of samples of tracks which can be set between the start frame and the end frame on the display unit, and may execute information display processing in which a specific track can be selected and set from the displayed plurality of samples.

In the imaging apparatus, the control unit may display a plurality of samples of movement speed which can be set between the start frame and the end frame on the display unit, and may execute information display processing in which a specific movement speed can be selected and set from the displayed plurality of samples.

In the imaging apparatus, the input unit may input a photographing period and number of images to be photographed as photographing information of low speed photographing, and the control unit may sequentially photograph a plurality of images according to a photographing interval which is calculated using the photographing period and the number of images to be photographed, and may execute image cutout processing according to the frame setting information in each of the photographed images.

According to another embodiment of the present disclosure, there is provided an image processing device which includes a control unit which cuts out an image in a specific region from each of a plurality of images which are photographed continuously or intermittently, in which the control unit executes cutout of an image frame from each photographed image by applying start frame setting information which denotes an image cutout position in a first image, and end frame setting information which denotes an image cutout position in a last image.

According to still another embodiment of the present disclosure, there is provided an image processing method which is executed in an imaging apparatus by a control unit, the method including displaying cutout positions of a start frame and an end frame on an object image which is displayed on a display unit according to information input through an input unit, and setting frame setting information including the cutout positions of the start frame and the end frame, and determining a cutout region of an image frame according to the frame setting information with respect to each of photographed images which are continuous or intermittent, and executing image cutout processing according to determined information.

According to yet still another embodiment of the present disclosure, there is provided a program which causes image processing to be executed in an imaging apparatus, the program causing a control unit to execute displaying cutout positions of a start frame and an end frame on an object image which is displayed on a display unit according to input information through an input unit, setting frame setting information including the cutout positions of the start frame and the end frame, determining a cutout region of an image frame according to the frame setting information with respect to each of photographed images which are continuous or intermittent, and performing image cutout processing according to determined information.

The program according to the embodiment of the present disclosure is a program which can be provided using a storage medium which is provided using a computer-readable format, and a communication medium with respect to an image processing device which can execute various programs and codes, or a computer system, for example. By providing such a program using the computer-readable format, it is possible to execute processing corresponding to a program in an information processing device, or on a computer system.

Further another characteristics, or benefits will be clarified by more detailed descriptions based on examples of the present disclosure which will be described later, or accompanying drawings. In addition, the system in the specification has a logical collective configuration of a plurality of devices, and devices in each configuration are not limited to being present in the same housing.

According to the embodiment of the present disclosure, an apparatus, and a method in which image cutout processing of a specific region corresponding to user setting is effectively performed from each photographed image which is obtained through low speed photographing or moving image photographing are realized.

Specifically, an object image which is input through an imaging unit is displayed, and frame setting information which includes cutout positions of a start frame and an end frame is set to be input onto a display image. A control unit executes image cutout processing according to frame setting information in each of photographed images which are continuous or intermittent. The frame setting information includes position and size information of the start frame and the end frame, track information and movement speed information between the start frame and the end frame, and a control unit determines an image cutout region with respect to each of photographed images by applying the setting information.

For example, according to the above described configuration, an apparatus, and a method in which effectively executes image cutout processing in a specific region corresponding to a user setting in each of photographed images which is obtained through low speed photographing or moving image photographing are realized.

In addition, effects which are described in the specification are merely examples, are not limited, and there may be additional effects.

BRIEF DESCRIPTION OF THE DRAWINGS

FIGS. 1A and 1B are diagrams which describe a configuration of an imaging apparatus;

FIG. 3 is a diagram which describes a corresponding example of the number of pixels of the photographed image of the imaging apparatus and the number of pixels of a display image of a display device;

FIGS. 4A to 4D are diagrams which describe corresponding examples of the number of pixels of a photographed image of the imaging apparatus and the number of pixels of a display image of the display device;

FIG. 20 is a diagram which describes an example of a hardware configuration of an image processing device.

DETAILED DESCRIPTION OF EMBODIMENTS

Figure 2A:
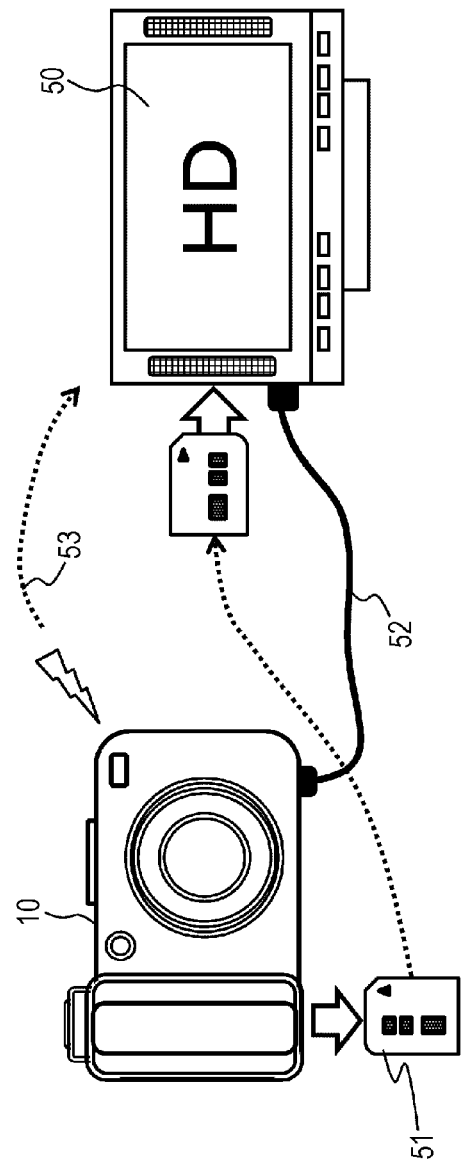
FIGS. 2A and 2B are diagrams which describe display processing of a photographed image of the imaging apparatus.

Hereinafter, an imaging apparatus, an image processing device, an image processing method, and a program according to embodiments of the present disclosure will be described in detail with reference to drawings. In addition, descriptions will be made according to the following items.

1. Regarding configuration example of imaging apparatus
2. Regarding example of display processing of photographed image
3. Regarding sequence of image photographing process of present disclosure
4. Regarding setting example of photographed image
5. Regarding process of image photographing and recording according to setting information
6. Regarding configuration example of hardware of imaging apparatus and image processing device
7. Conclusions for configuration of present disclosure
1. Regarding Configuration Example of Imaging Apparatus First, a configuration example of an imaging apparatus which executes processes of the present disclosure will be described with reference to FIGS. 1A and 1B.

FIGS. 1A and 1B are diagrams which illustrate an appearance of an imaging apparatus 10 of the present disclosure. FIG. 1A is a front view, and FIG. 1B is a rear view of the imaging apparatus 10. The imaging apparatus 10 includes a lens 11, a shutter 12, a display unit 21, and an input unit 22.

An object image which is input through the lens 11 which configures an imaging unit is displayed on the display unit 21. In addition, the imaging apparatus which executes processes of the present disclosure is, for example, a Digital Single Lens Reflex Camera (DSLR), or a general digital camera, includes the display unit 21 which displays an object image as a photographing target, and has a configuration in which a user (photographer) can perform photographing by checking an image which is displayed on the display unit 21.

The imaging apparatus 10 is an imaging apparatus which can perform moving image photographing or low speed (time lapse) photographing. As described above, low speed photographing is a process in which a still image is sequentially photographed in an intermittent manner.

In the following example, an example of a case in which low speed (time lapse) photographing is performed will be described. However, processes which are described below are not limited to low speed (time lapse) photographing, and can also be applied to general moving image photographing.

In addition, it is preferable to perform photographing in a state in which the imaging apparatus is fixed when applying processes of the present disclosure which will be described later. Specifically, photographing is performed in a state in which the imaging apparatus is fixed to a tripod, or the like.

The display unit 21 is used in a reproduction display of a photographed image which is recorded in a memory, in addition to an object image which is input through the lens 11, and displays various information such as various operation information or manuals. In addition, the display unit 21 may have a configuration including a touch panel function. In this case, the display unit 21 also functions as an input unit which inputs information on user operations. Switching of display information of the display unit 21 is performed using user operations with respect to an input unit 22 or the display unit (input unit) 21.

When performing the low speed (time lapse) photographing to which processes of the present disclosure are applied, a user (photographer) can designate positions and sizes of a start frame and an end frame in an image which is displayed on the display unit 21 before starting photographing.

The start frame and the end frame which are designated by the user are stored in a memory in the imaging apparatus as position and size information of a frame for generating an image which is cut out (trimmed) from a photographed image, and is stored in a storage unit such as a flash memory.

The user fixes the imaging apparatus toward a direction of an object by fixing a camera to a tripod, or the like, for example, before starting photographing, and displays an object image, a so-called through image, which is input through the lens 11 on the display unit 21. The user designates positions and sizes of a photographing start image frame and a photographing end image frame in the image (through image) which is displayed on the display unit 21.

A plurality of still images in which the designated photographing start image frame is set to a starting point, and the photographing end image frame is set to an ending point are recorded by starting photographing, by performing designation of two image frames of the start point and end point.

Specific processing thereof will be described in detail later.

2. Regarding Example of Display Processing of Photographed Image

Subsequently, an image display example when a photographed image of the imaging apparatus 10 is displayed will be described with reference to FIGS. 2A and 2B.

As illustrated in FIG. 2A, the photographed image using the imaging apparatus 10 is stored in a recording medium 51 which is a storage unit. The image which is stored in the recording medium 51 can be reproduced and displayed, and is displayed on a display device 50 such as a television which can display a High Definition (HD) image by being output, as illustrated in FIGS. 2A and 2B, for example.

In addition, when the photographed image is displayed on the display device 50, the recording medium 51 is taken out from the imaging apparatus 10, and is mounted on the display device 50. Alternatively, the image is transferred to the display device 50 from the imaging apparatus 10 through a signal transmission cable 52. Alternatively, the image is transferred to the display device 50 from the imaging apparatus 10 through a wireless communication path 53. Any one of these processes is performed.

Figure 2B:
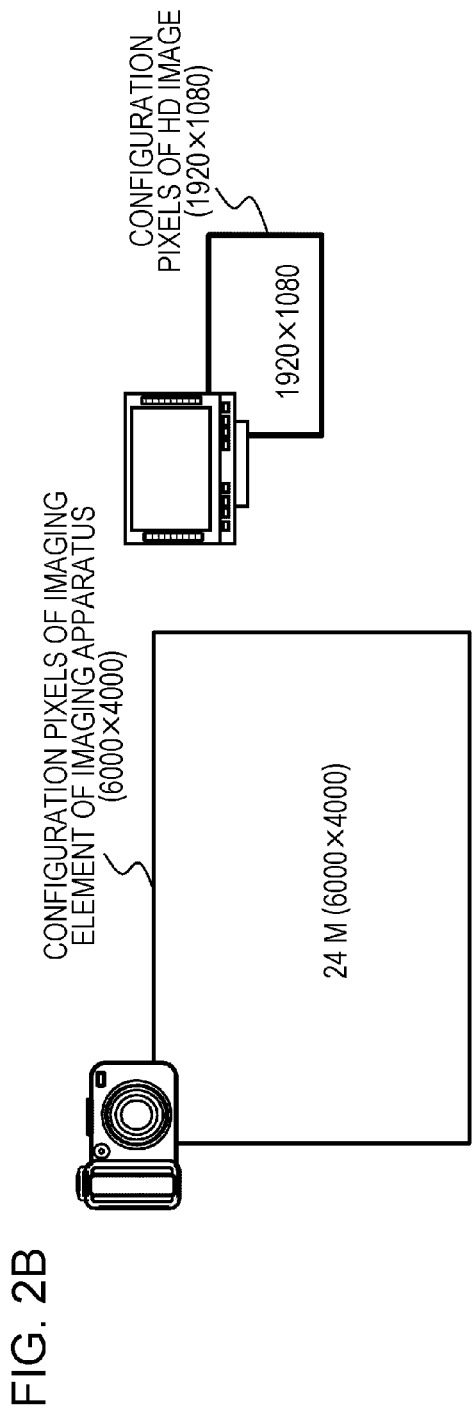

In recent years, an imaging element of the imaging apparatus 10 has come to have a significant number of pixels, and as illustrated in FIG. 2B, for example, the imaging element has pixels where the number of transverse pixels x the number of longitudinal pixels ≅6000×4000. In contrast to this, the display device 50 which is an HDTV which can display an HD image has pixels where the number of transverse pixels x the number of longitudinal pixels 1920×1080.

In this manner, the number of pixels of the imaging element which is used in the latest general camera is set to be much larger than the number of pixels of a general high-vision image display device such as an HDTV.

Accordingly, it is not possible to display the entire photographed image of the imaging apparatus on a display device such as an HDTV with the number of pixels as is, and it is necessary to reduce the number of pixels of 6000×4000 by executing a thinning process on pixels, generate an image for displaying with the number of pixels of 1920×1080, and output the image.

In other words, this means that it is possible to display a high resolution HD image even when a partial region of a photographed image of the imaging apparatus 10 including the imaging element having a significant number of pixels is cut out, and is output to the display device 50.

That is, as illustrated in FIG. 3, a photographed image 71 of the imaging apparatus 10 has a number of pixels of 6000×4000. A part of a pixel region (pixels of 1920×1080) of the photographed image 71 is subjected to cutout processing (trimming), and becomes an output image 72 which is displayed on the display device 50. In an example illustrated in FIG. 3, the output image has a number of pixels of 1920×1080. That is, the output image has the number of pixels corresponding to the HD image.

In this manner, even when a partial region of the photographed image is cut out, and the cutout region is set to the output image 72, it is possible to output and display the image as an HD image without deteriorating an image quality on the display device 50.

In addition, a setting example of the output image 72 illustrated in FIG. 3 is an example of image cutout which is necessary for outputting an HD image, and it is also possible to set various image cutout regions in addition to this.

FIGS. 4A to 4D are diagrams which illustrate setting examples of a photographed image and an output display image.

A rectangular region using a dotted line is a photographed image, and has configuration pixels of 6000×4000. On the other hand, a rectangular region using a solid line is a pixel region of an output display image with respect to the display device.

FIG. 4A is the same setting example as that described in FIG. 3, and is an example in which a cutout region of an output image of 1920×1080 pixels is set at an approximate center of the photographed image.

FIG. 4B is an example in which the cutout region of the output image of 1920×1080 pixels is set on the upper left part of the photographed image.

FIG. 4C is an example in which a cutout region of an output image of 3840×2160 pixels is set on the lower right part of the photographed image.

FIG. 4D is an example in which a cutout region of an output image of 5760×3240 pixels is set on the lower right part of the photographed image.

In addition, since the number of pixels of the cutout regions in FIGS. 4C and 4D is larger than the number of pixels of the HD image, it is necessary to be output by reducing the number of pixels thereof, when being output to the HD image display device. However, even in this case, the original image has a number of pixels which is larger than that of the HD image, and an output image which is obtained by reducing the number of pixels becomes an image which has an image quality of the HD image.

In this manner, even when processing of outputting a partial region of the photographed image to the display device is performed by cutting out the region, or processing of recording the region in a memory is performed, it is possible to perform a process of displaying or recording an image with an image quality corresponding at least to the HD image.

3. Regarding Sequence of Image Photographing Process of Present Disclosure

Subsequently, a sequence of an image photographing process of the present disclosure will be described with reference to a flowchart illustrated in FIG. 5.

Figure 5:
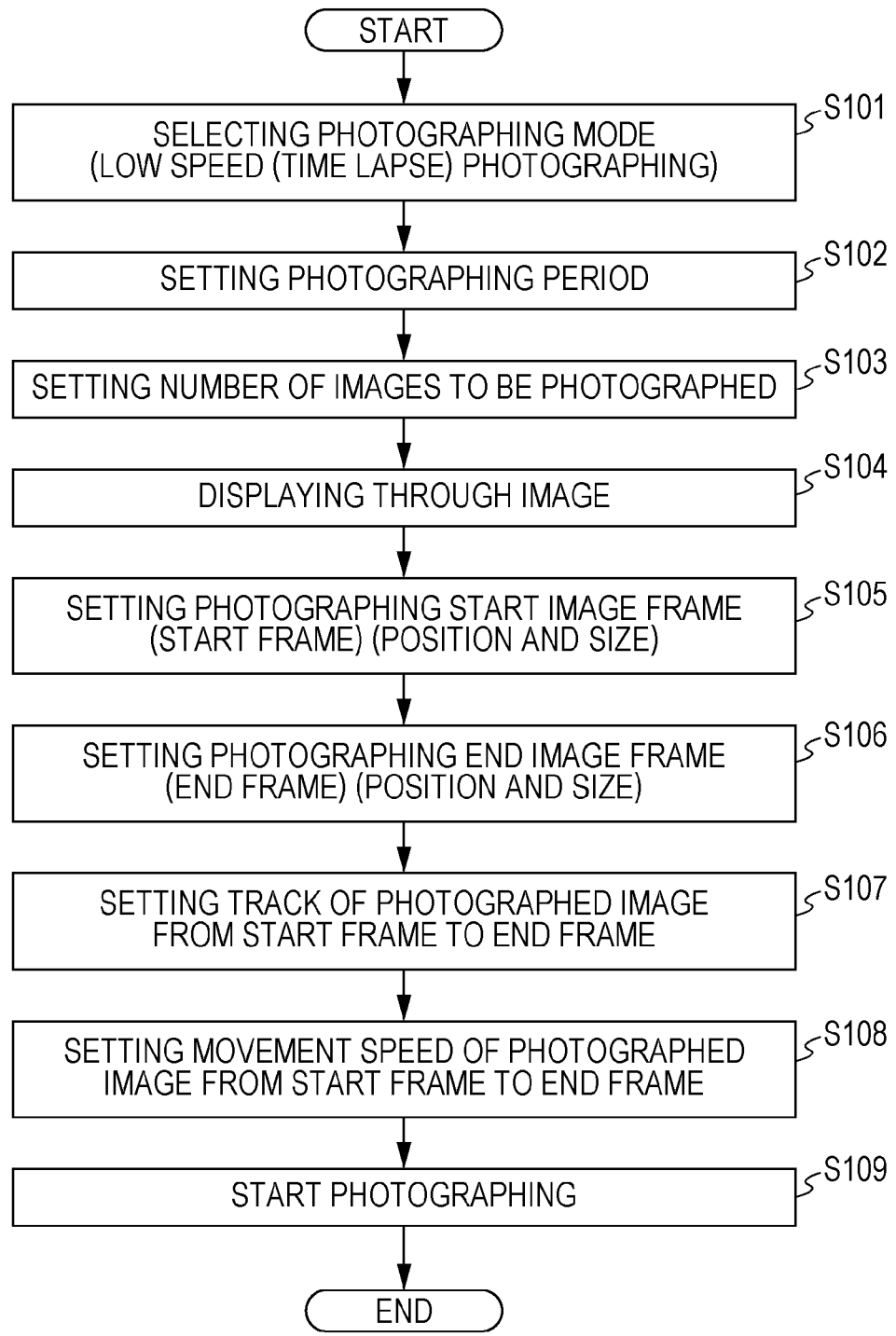
FIG. 5 is a diagram of a flowchart which describes a sequence of a setting process of various information in an image photographing process of the imaging apparatus.

The flowchart illustrated in FIG. 5 is a flowchart which describes a processing procedure from setting of various setting information when performing low speed photographing, that is, parameters which are applied to the image photographing process or recording process to a start of photographing.

For example, the setting information corresponding to the flow is recorded in a memory of the imaging apparatus under a control of the control unit of the imaging apparatus. In addition, when executing the image photographing process, the control unit of the imaging apparatus reads the setting information which is stored in the memory, and executes the process of image photographing or image recording which corresponds to the setting information.

Hereinafter, processing in each step of the flow illustrated in FIG. 5 will be sequentially described.

Step S101

First, a user (photographer) selects a photographing mode. In addition, according to the example, an example in which the low speed (time lapse) photographing is selected as the photographing mode will be described.

In step S101, a low speed photographing mode is selected as the photographing mode. In addition, setting processes of various information which are executed after step S101 are executed using a user operation through the input unit 22 of the imaging apparatus 10 which is illustrated in FIG. 1. When the display unit 21 is a touch panel display unit, it is also possible to perform the setting process using a user operation with respect to the display unit (input unit) 21.

Steps S102 and S103

Subsequently, the user sets a photographing period in step S102, and sets the number of images to be photographed in step S103.

The setting of photographing period is setting of time from a start to an end of photographing of the low speed photographing.

The setting of the number of images to be photographed is a process of setting the number of images to be photographed during the set photographing period.

For example, processes in which the photographing period is set to four hours, and the number of images to be photographed is set to 240 are performed.

Photographing period=4 hours

Number of images to be photographed=240

For example, when the above described setting is performed, and a photographing interval in each image frame is the same, photographing of sixty images per hour, approximately, is performed, and image photographing of one image is performed approximately in a unit of one minute.

Step S104

Subsequently, a user (imaging apparatus) fixes a lens of the imaging apparatus toward a direction of an object, and displays an image which is input through the lens on the display unit. A so-called through image is displayed on the display unit.

Step S105

Subsequently, the user (imaging apparatus) inputs frame setting information with reference to the through image which is displayed on the display unit.

In steps S105 to S108, the user inputs various frame setting information for determining an image cutout position, or the like, related to a plurality of image frames which are photographed and recorded in the low speed photographing or the moving image photographing.

First, in step S105, an image which is photographed for a first time in the low speed photographing, that is, a position and size of a start frame are set.

A specific example of the processing in step S105 will be described with reference to FIG. 6.

Figure 6:
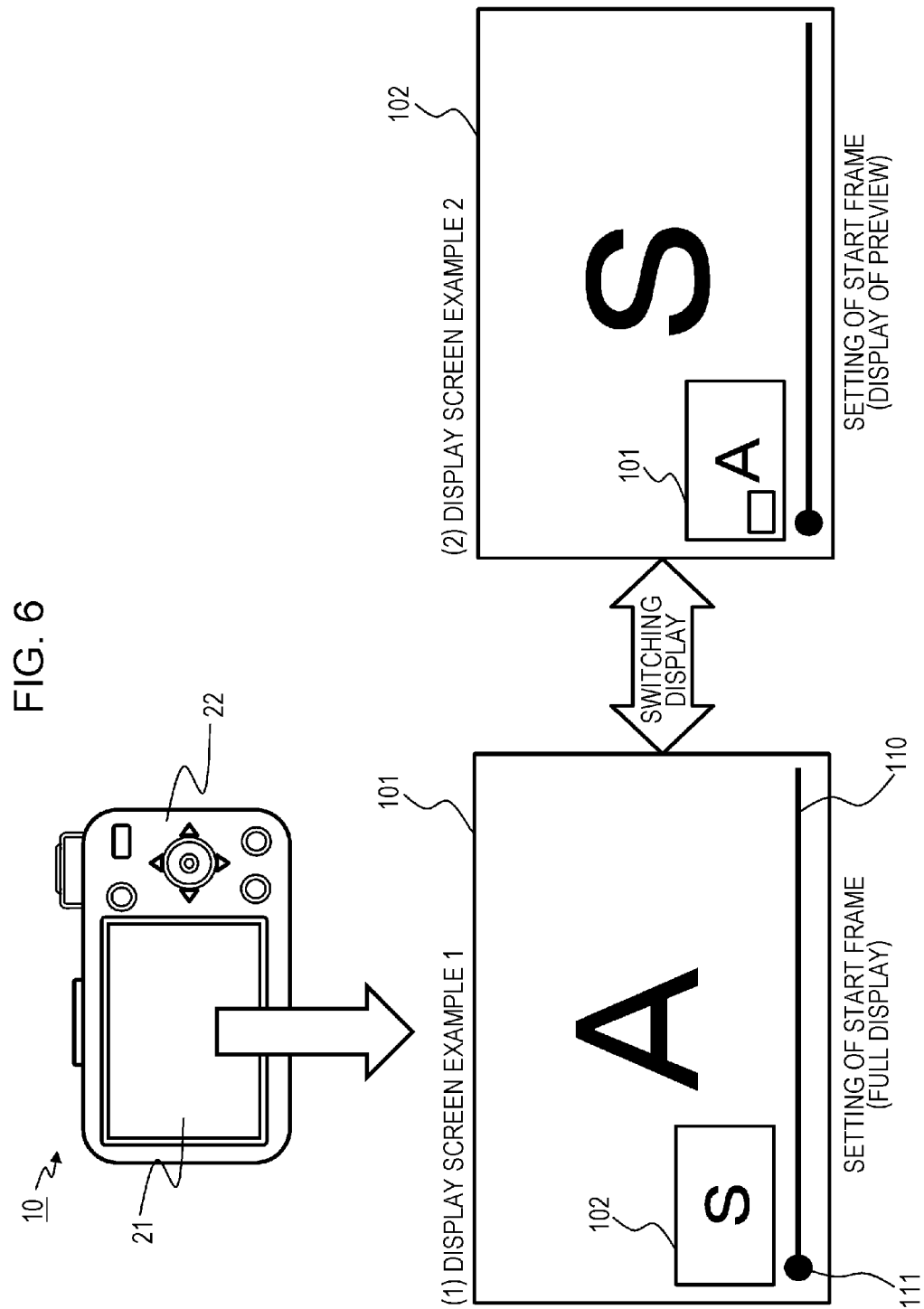
FIG. 6 is a diagram which describes details of a setting process of a start frame.

A display screen example 1 in FIG. 6(1) is a diagram which illustrates a display image example of the display unit 21 in a process of setting the start frame.

In the imaging apparatus 10, the current photographed image (through image) 101 which is input through the lens by the imaging apparatus 10 is displayed on the entire display unit 21. A display image of a character A in the figure is the current photographed image (through image) 101.

One line which is illustrated on the lower part of the photographed image (through image) 101 is a time line 110. A black circle on a left end of the time line 110 is a set time instruction mark 111.

The left end of the time line 110 corresponds to a photographing start time of the low speed photographing, and a right end thereof is a line which denotes a time axis corresponding to a photographing end time.

In the example in FIG. 6(1), since the set time instruction mark 111 is denoted on the left end, it is denoted that the current display screen is a screen which performs setting of a photographed image at the photographing start time of the low speed photographing.

In addition, the user can freely move the set time instruction mark 111 on the time line 110 by operating the input unit, and can set the position and size of the photographed image frame at a time of setting after the setting of the set time instruction mark 111 at an arbitrary position.

The example illustrated in FIG. 6(1) is an example in which the set time instruction mark 111 is set on the left end, and is an image frame of a starting time of the low speed photographing, that is, a screen on which a start frame (S) 102 illustrated in FIG. 6(1) is set. A rectangular frame in which a character S is illustrated in FIG. 6(1) is the start frame (S) 102. The example illustrated in FIG. 6(1) is an example in which the start frame (S) 102 is set at a position on the lower left. It is preferable that the start frame (S) 102 be set to have a number of pixels of equal to or greater than 1920×1080 pixels, for example. That is, having at least the number of pixels which can be displayed on the display device, for example, the number of pixels which is equal to or greater than the number of pixels corresponding to an HD image which can be displayed on the display device 50 illustrated in FIGS. 2A and 2B is preferably set.

The user can determine an image position of the start frame (S) at an arbitrary position on the photographed image (through image) 101, and can determine a frame size of the start frame (S).

An example of a setting sequence of the start frame will be described with reference to FIG. 7. The upper stage in FIG. 7 (S21: initial screen) is an example of an initial screen when setting the start frame. As illustrated in (S21), the initial screen is an image in which the start frame 102 of 1920×1080 pixels, for example, is displayed on the photographed image (through image) 101 as an initial setting.

The user moves the start frame 102 of the initial setting to an arbitrary position by designating the start frame. For example, as illustrated in FIG. 7 (S22: position determining process), the start frame 102 is moved by being designated using a cursor (indicator) 105.

Figure 7:
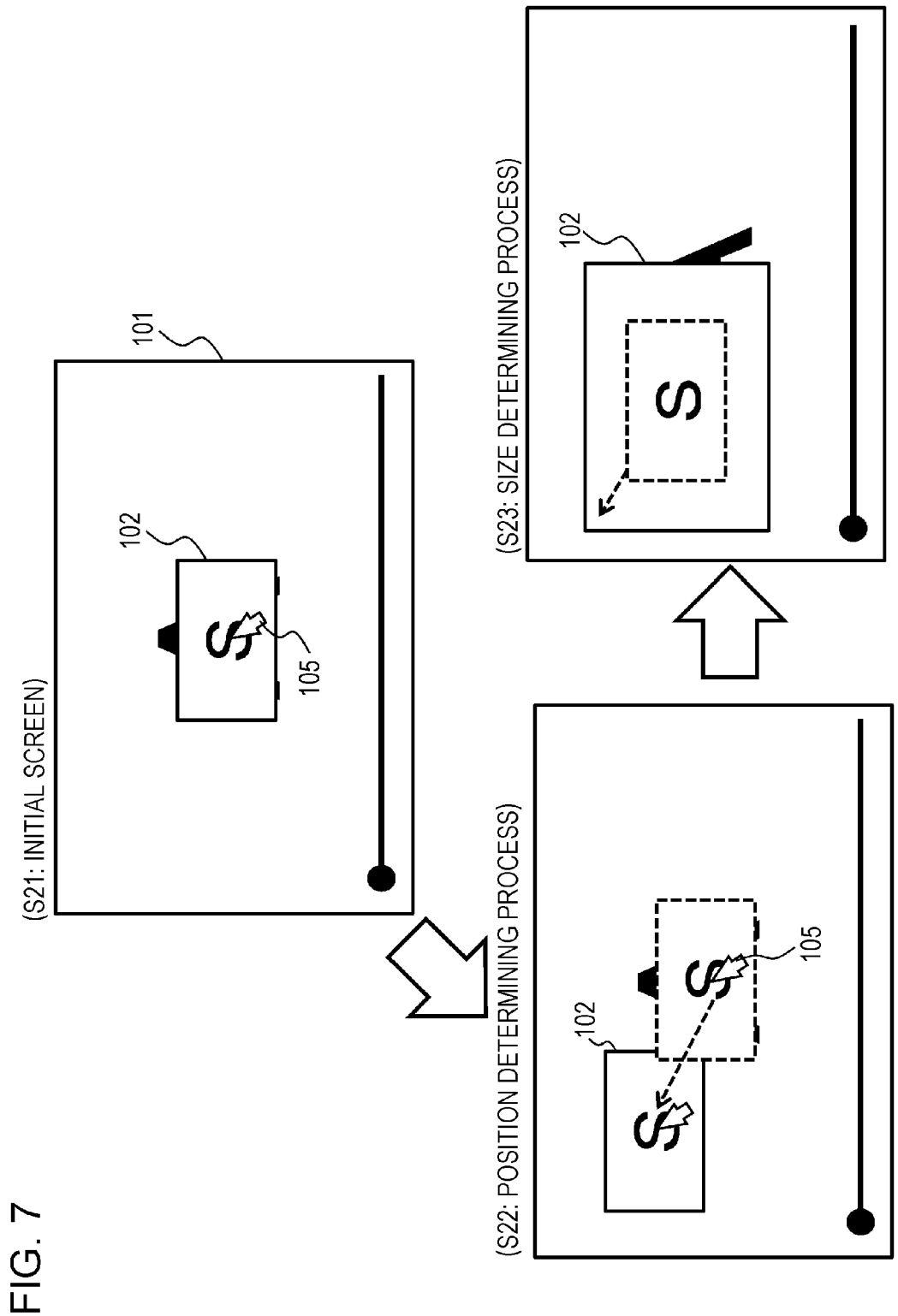
FIG. 7 is a diagram which describes an example of a specific sequence of the setting process of the start frame.

A position of the start frame 102 is determined using the movement processing, and as illustrated in FIG. 7 (S23: size determining process), a size thereof is determined by changing a size of the rectangle frame of the start frame 102. The processing can be performed by operating a switch or a jog dial of the input unit 22, for example. Alternatively, in a case of the touch panel display unit 21, a configuration may be possible in which the size can be changed using an operation of expanding or contracting the rectangular frame of the start frame 102 using a finger.

The user determines the position and size of the start frame according to the processing sequence illustrated in FIG. 7, for example. In addition, an operation method in which the cursor, the jog dial or the switch of the operation unit, or the touch panel is applied has been described as the operation method for determining the position and size of the start frame in FIG. 7, however, it is an example. The operation method is determined according to a configuration of the input unit of the imaging apparatus, and it is possible to determine the position and size of the start frame by applying various operation methods corresponding to a configuration of the operation unit.

The display screen example 1 in FIG. 6(1) is an example of a display image of the display unit at a period of time of determining the position and size of the start frame 102. The display image in FIG. 6(1) is subjected to a full screen display of the photographed image (through image) 101, and a partial region thereof becomes a display position of the start frame 102. In addition, the user displays the image of the start frame 102 using the entire display region of the display unit, as illustrated in a display screen example 2 in FIG. 6(2), and can display an image denoting an image which denotes a positional relationship of the start frame with respect to the through image as a sub-screen.

The user can switch between the two images which are illustrated in FIGS. 6(1) and 6(2). The switching process is performed using a user operation to which the input unit 22 is applied.

Step S106

In step S105, after determining the position and size of the start frame, subsequently, the user (imaging apparatus) inputs new frame setting information with reference to the through image which is displayed on the display unit. Specifically, a position and size of an image which is lastly photographed in the low speed photographing, that is, the position and size of an end frame are set.

A specific example of the process in step S106 will be described with reference to FIG. 8.

Figure 8:
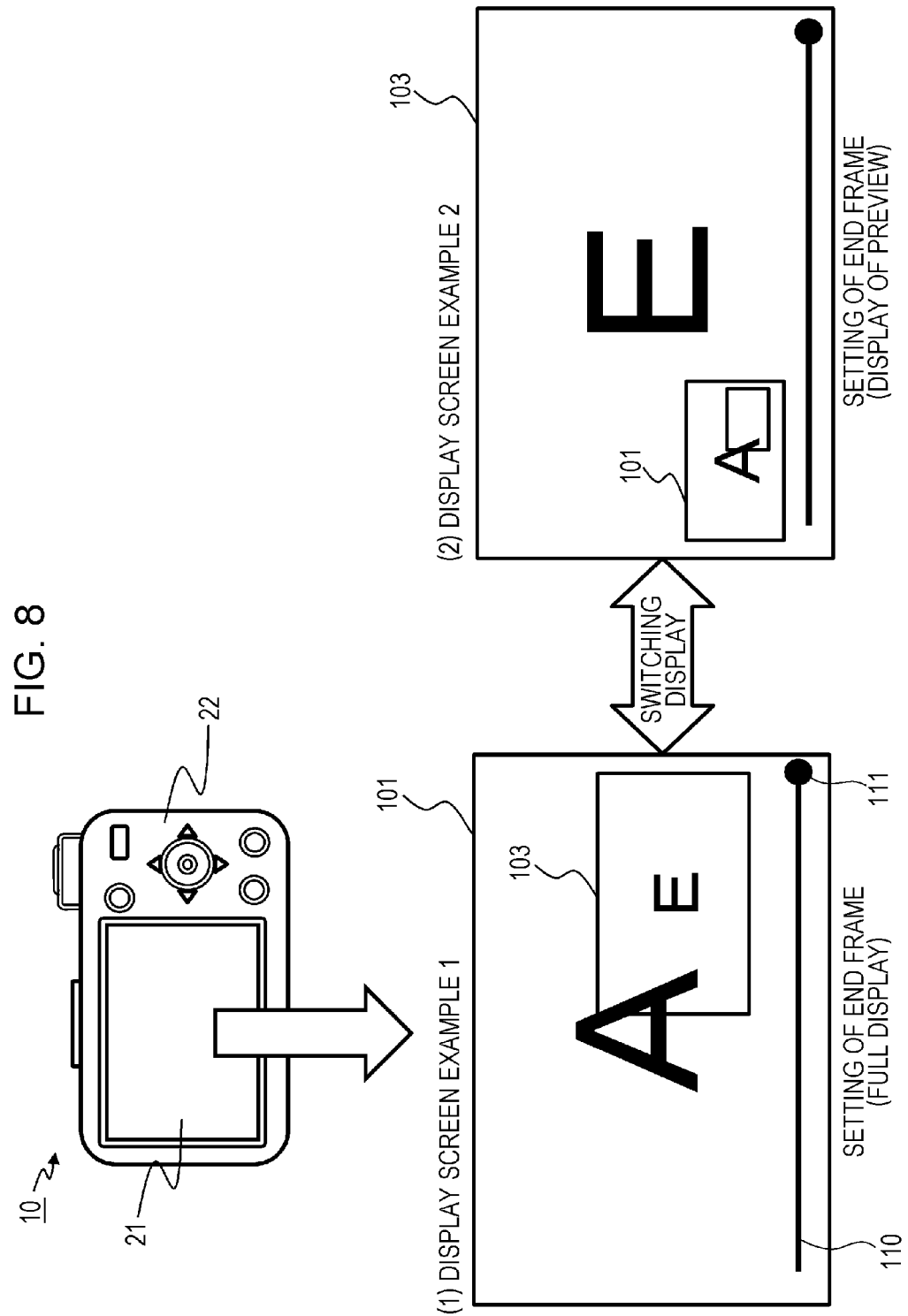
FIG. 8 is a diagram which describes details of a setting process of an end frame.

A display screen example 1 in FIG. 8(1) is a diagram which illustrates a display image example of the display unit 21 at a time of setting the end frame.

The current photographed image (through image) 101 which is input through the lens by the imaging apparatus 10 is displayed on the entire display unit 21. A display image of a character A illustrated in FIG. 8(1) is the current photographed image (through image) 101.

One line illustrated on the lower part of the photographed image (through image) 101 is the time line 110. A black circle on the right end of the time line 110 is the set time instruction mark 111.

As described above, the left end of the time line 110 corresponds to the start time of the low speed photographing, and the right end is a line denoting a time axis corresponding to the end time.

FIG. 8(1) illustrates an example of a case in which the set time instruction mark 111 is set on the right end, and an image frame at the end time of the low speed photographing, that is, the end frame (E) 103 which is illustrated in FIG. 8(1) is set. A rectangular frame in which a character E is illustrated in FIG. 8(1) is the end frame (E) 103. In the example, a case in which the end frame (E) 103 is set at a position on the lower right is illustrated. It is preferable that the end frame (E) 103 be set so as to have a number of pixels which is equal to or greater than 1920×1080 pixels, for example. That is, having the number of pixels which is equal to or greater than the number of pixels which can be displayed at least on the display device, for example, the number of pixels which is equal to or greater than the number of pixels corresponding to the HD image which can be displayed on the display device 50 illustrated in FIGS. 2A and 2B is preferably set.

The user is able to determine an image position of the end frame at an arbitrary position on the photographed image (through image) 101, and to determine an arbitrary frame size.

A setting sequence of the end frame is the same as that of the start frame which is described with reference to FIG. 7 previously. It is a process in which the start frame (S) 102 illustrated in FIG. 7 is replaced with the end frame (E).

The initial screen when setting the end frame (E) is a screen in which the end frame (E) of 1920×1080 pixels, for example, is displayed on the photographed image (through image) 101, as illustrated in (S21: initial screen) on the upper stage in FIG. 7.

The user designates the displayed end frame (E), and moves the frame to an arbitrary position. As illustrated in FIG. 7 (S22: position determining process), the end frame (E) is moved using the cursor (indicator) 105. The position of the end frame (E) is determined due to the movement processing, and as illustrated in FIG. 7 (S23: size determining process), the size of the end frame (E) is determined by changing the size of a rectangular frame of the frame.

The display screen example 1 in FIG. 8(1) is an example of a display image of the display unit at a point of time in which the position and size of the end frame 103 are determined. The display image in FIG. 8(1) is subjected to a full screen display of the photographed image (through image) 101, and a partial region thereof becomes the display position of the end frame 103. In addition, as illustrated in a display screen example 2 in FIG. 8(2), the user displays an image of the end frame 103 using the entire display region of the display unit, and is capable of performing switching to an image in which an image denoting a positional relationship of the end frame with respect to a through image is denoted as a sub-screen. The switching process is performed using a user operation to which the input unit 22 is applied.

In this manner, the user is able to determine a position and size of each image frame of the first photographed image (start frame) and the last photographed image (end frame) at the time of low speed photographing or moving image photographing while displaying the through image which is taken through the lens on the display unit 21 of the imaging apparatus 10.

Step S107

In step S107 of a flow illustrated in FIG. 5, a track of a photographed image from the start frame which is set in step S105 to the end frame which is set in step S106 is set.

The track is used as information for determining a position and size of an intermediate frame which is photographed between the start frame and the end frame in the low speed photographing.

A specific example of a track setting process in step S107 will be described with reference to FIGS. 9 and 10.

Figure 9:
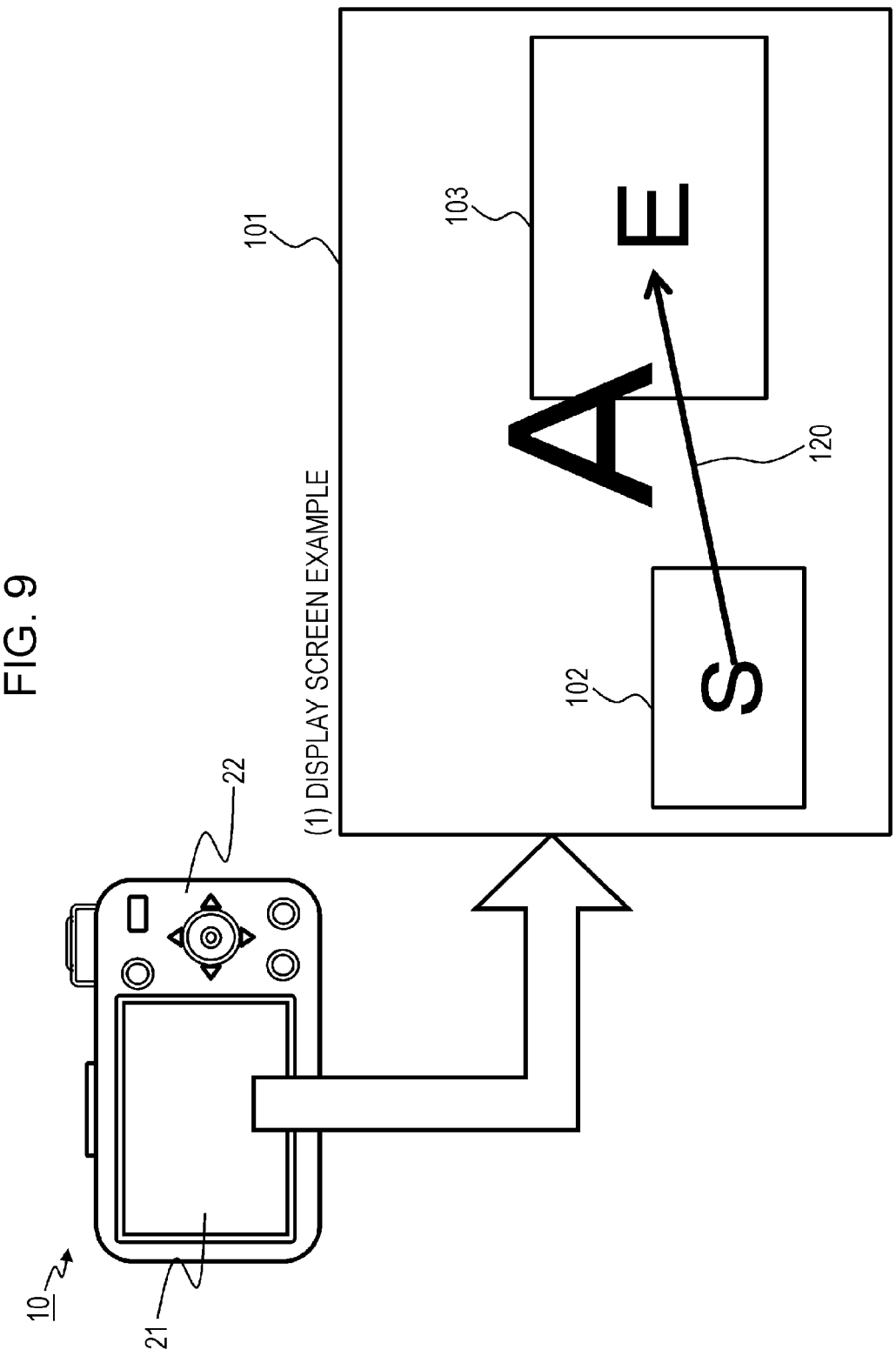
FIG. 9 is a diagram which describes details of a track setting process.

A display screen example 1 in FIG. 9(1) is a diagram which illustrates an example of a display screen of the display unit 21 of the imaging apparatus 10 at the time of a track setting process.

The photographed image (through image) 101 which is taken through the lens of the imaging apparatus is displayed on the display unit 21 of the imaging apparatus 10 at the starting point of time of the track setting process in step S107, and setting frames of the start frame (S) 102 and the end frame (E) 103 which are set in steps S105 and S106 are displayed.

In step S107, a line which connects the two frames is set as a track setting line 120.

The track setting line illustrated in FIG. 9 denotes an example in which a track of a straight line is set as an example, however, the track is not limited to the straight line, and it is possible to set various forms such as a curved line, or a polygonal line.

Figure 10:
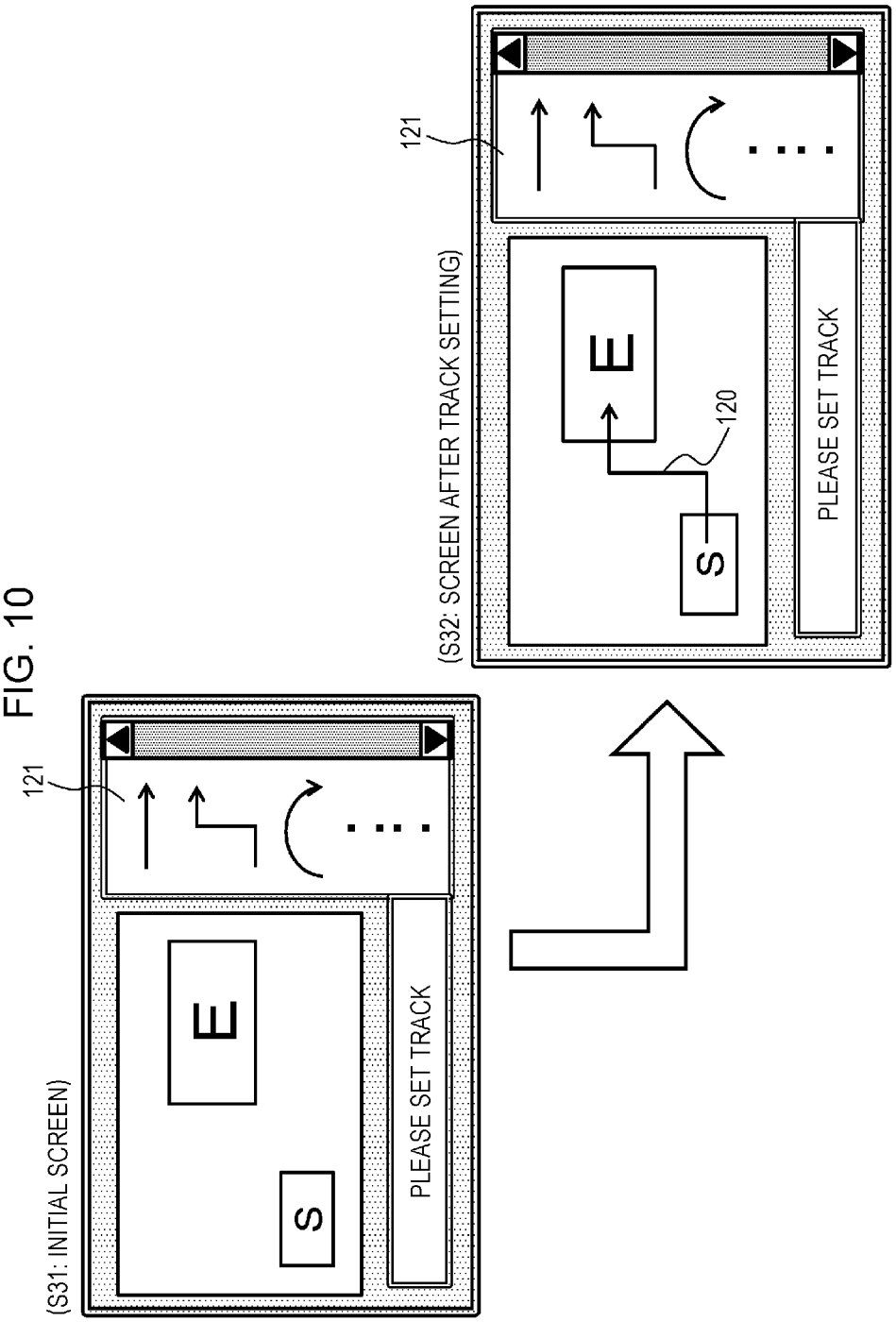
FIG. 10 is a diagram which describes an example of a specific sequence of the track setting process.

FIG. 10 is a diagram which illustrates a screen example of the display unit 21 when setting the track. (S31: initial screen) is an example of the initial screen of the display unit 21 when setting the track.

Track setting icons 121 are displayed on the display unit 21 of the imaging apparatus 10, in addition to the image display region in which the rectangular frames of the start frame (S) and the end frame (E) which are already set with respect to the through image are displayed.

A plurality of samples of a track line which can be selected in order to set a track from the start frame (S) to the end frame (E) are illustrated in the track setting icons 121. The user can set a track by selecting any one of the samples.

FIG. 10 (S32: screen after setting track) illustrates an example in which the user selects a track of a polygonal line, and determines the line as the track.

As illustrated in FIG. 10, the polygonal line which connects the start frame (S) and the end frame (E) is displayed as a track setting line 120.

When a recording process of the low speed photographing or the moving image photographing is started, a process of sequentially recording an image which goes along the track which is set by the user in a memory as a recording image is performed according to a control of the control unit of the imaging apparatus.

Step S108

Subsequently, in step S108 of the flow illustrated in FIG. 5, a movement speed corresponding to a transition speed of images which are sequentially photographed according to the track from the start frame (S) to the end frame (E) which is set in step S107 is set.

The movement speed is also used as information for determining the position and size of an intermediate frame which is photographed between the start frame and the end frame in the low speed photographing, similarly to the track.

A specific example of a movement speed setting process in step S108 will be described with reference to FIG. 11.

Figure 11:
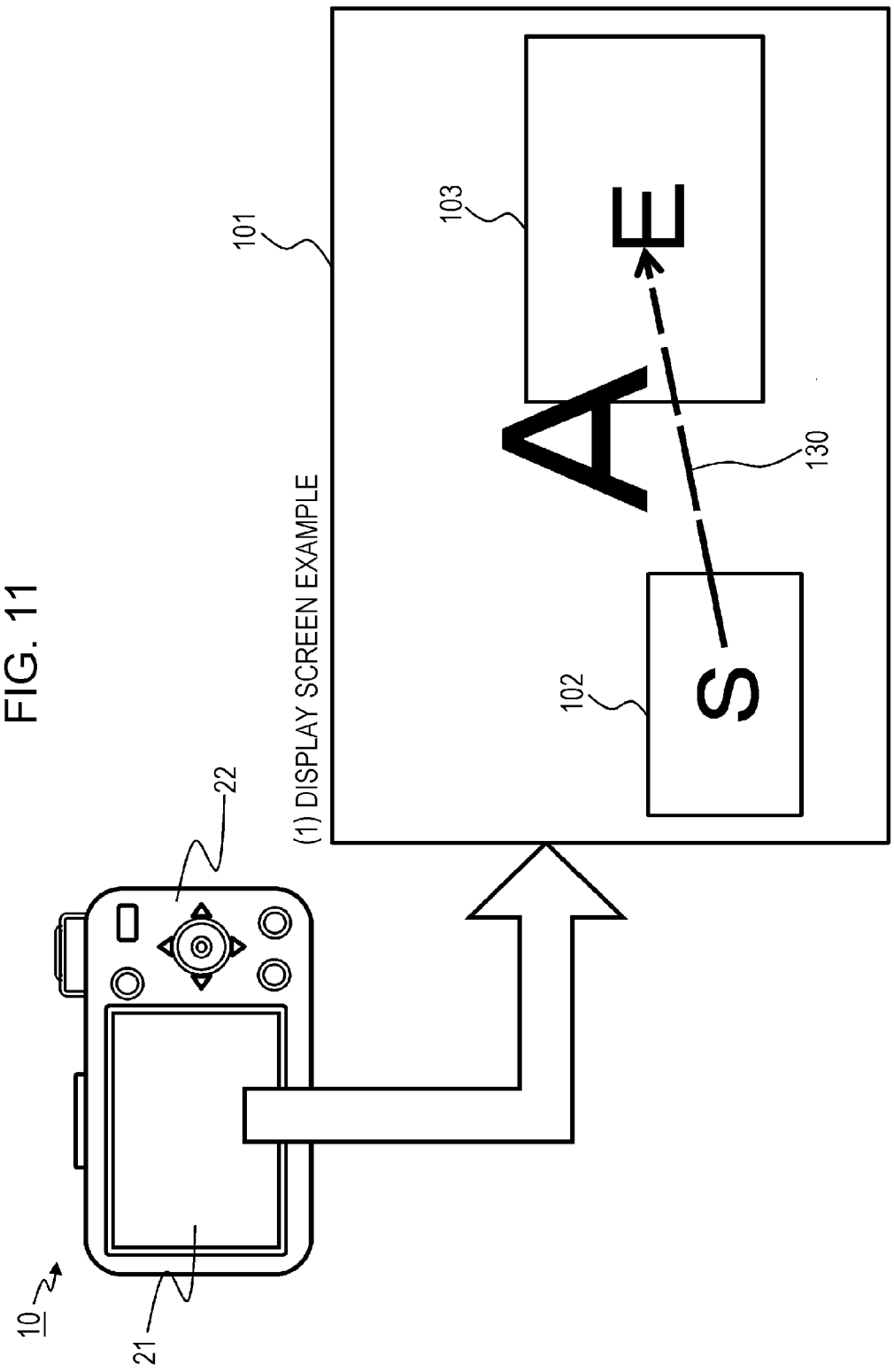
FIG. 11 is a diagram which describes details of a movement speed setting process.

A display screen example 1 in FIG. 11(1) is a diagram which illustrates an example of a display screen of the display unit 21 of the imaging apparatus 10 when performing the movement speed setting process.

The photographed image (through image) 101 which is taken through the lens of the imaging apparatus is displayed on the display unit 21 of the imaging apparatus 10 at a starting point of time of the movement speed setting process in step S108, and the setting frames of the start frame (S) 102 and the end frame (E) 103 which are set in steps S105 and S106, and the track setting line which connects the start frame (S) 102 and the end frame (E) 103 which is set in step S107 are displayed.

In step S108, a process of changing the track setting line which connects the start frame and the end frame to a movement speed setting line 130 is performed.

The movement speed setting line is a line for setting a movement speed of a plurality of image frames which are photographed between the start frame (S) 102 and the end frame (E).

For example, the movement speed setting line 130 which is illustrated in FIG. 11 is displayed using a dotted line which connects the start frame (S) 102 and the end frame (E) 103, however, the length of the lines is set to be long on the start frame (S) 102 side, and to be short on the end frame (E) 103 side.

A movement speed denoted by the long dotted lines is low, and a movement speed of the short dotted lines is high.

That is, the movement speed setting line 130 illustrated in FIG. 11 denotes that a movement speed of the plurality of image frames which are sequentially photographed between the start frame (S) 102 and the end frame (E) 103 at a predetermined time interval is set as follows.

A movement speed right after photographing of the start frame (S) is set to be low.

That is, photographing of the subsequent image frame is performed by setting a movement distance from the start frame (S) 102 to be small.

Thereafter, the movement speed is gradually increased, and photographing is performed by setting the movement speed to be high when approaching photographing of the end frame (E) 103.

That is, a photographing process is performed by setting a movement distance between the end frame (E) 103 and the previous photographed image frame to be large, for example.

In this manner, setting of a movement speed of a frame position of each image which is photographed at a predetermined interval is performed. Such setting is performed. Due to the setting of the movement speed, even when an interval of a photographing time of each image frame is set to be constant, it is possible to set a distance between frames which move during the constant photographing interval to be different.

A specific example of correlation between each photographing frame and a movement speed when setting the movement speed setting line 130 illustrated in FIG. 11 will be described with reference to FIG. 12.

Figure 12:
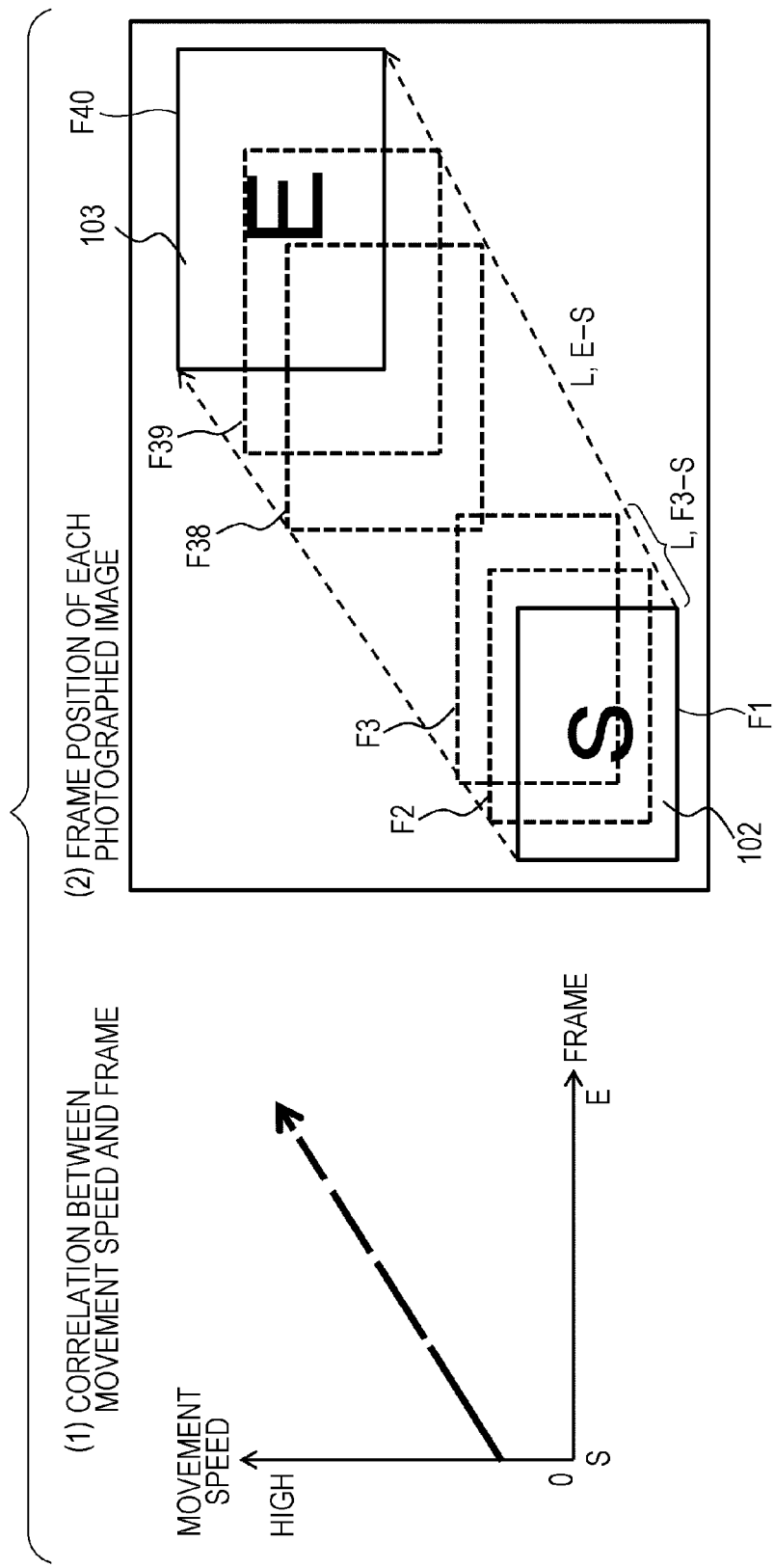
FIG. 12 is a diagram which describes correlation between the movement speed and each image frame.

FIG. 12(1) is a graph which illustrates correlation between the movement speed and a frame when the movement speed setting line 130 illustrated in FIG. 11 is set. The horizontal axis denotes a frame, and the vertical axis denotes a movement speed.

The horizontal axis is a line in which a photographing frame sequentially proceeds in the right direction, and reaches the end frame (E) by setting the left end to the start frame (S).

The vertical axis denotes that the speed is low on the lower side, and the speed is high on the upper side.

As described above, the movement speed right after photographing the start frame (S) is low, the movement speed is gradually increased thereafter, and becomes the highest when approaching photographing of the end frame (E).

FIG. 12(2) is a diagram which illustrates a position and size of an image frame which is photographed between the start frame (S) and the end frame (E).

The example illustrated in FIG. 12 is an example in which forty frames are set to be photographed between the start frame and the end frame, the start frame (S=F1) 102 is set in a small rectangular region on the lower left, and the end frame (E=F40) is set to a slightly large rectangular region on the upper right.

The movement speed right after the photographing of the start frame (S) is low, similarly to the speed illustrated in FIGS. 11 and 12(1), is gradually increased thereafter, and becomes the highest when approaching the photographing of the end frame (E).

When setting the movement speed, a movement distance between frames of a frame 2 (F2) and a frame 3 (F3) which are photographed right after the start frame (S=F1) is set to be small. As illustrated in FIG. 12(2), an interval of each frame position between F1 and F3 is set to be small. The reason is that the movement speed is set to be low.

The movement speed becomes gradually higher thereafter, and an interval between each of frames becomes gradually larger. An interval between each of frames such as an interval between the end frame (E=F40) which is the final photographed image and a frame 39 (F39) which is a frame photographed right before the end frame, and a frame 38 (F38) which is the previous frame to the frame 39 becomes large. The reason is that the movement speed is set to be high.

In addition, a size of each image frame is set to a size between the start frame (S) 102 and the end frame (E) 103 as illustrated in FIG. 12(2), and becomes a size which is determined according to a distance from the start frame and the end frame.

As illustrated in FIG. 12(2), a separation distance between the start frame (S) 102 and the end frame (E) 103 is set to L(E−S), a size of the start frame (S) 102 is set to S (size), and a size of the end frame (E) 103 to E (size).

At this time, for example, a distance L(F3−S) from the start frame (S) 102, and a size [F3(size)] of a third frame (F3) which is set at a separated position are determined using the following calculating formula.

$$F3(size)=S(size)+((E(size)-S(size))*(L(F3-S)/L(E-S)))$$

When the above-described formula is denoted by being generalized, the distance L(Fn−S) from the start frame (S) 102, and a size of an nth frame (Fn) [Fn(size)] which is set at a separated position are determined by the following calculating formula.

$$Fn(size)=S(size)+((E(size)-S(size))*(L(Fn-S)/L(E-S)))$$

In addition, the size corresponds to the length of one side of each frame.

The examples which are described with reference to FIGS. 11 and 12 are examples in which the movement speed setting line in which the movement speed of moving from the start frame to the end frame is set to be gradually higher is used, however, it is possible to variously set the movement speed in addition to that.

Figure 13:
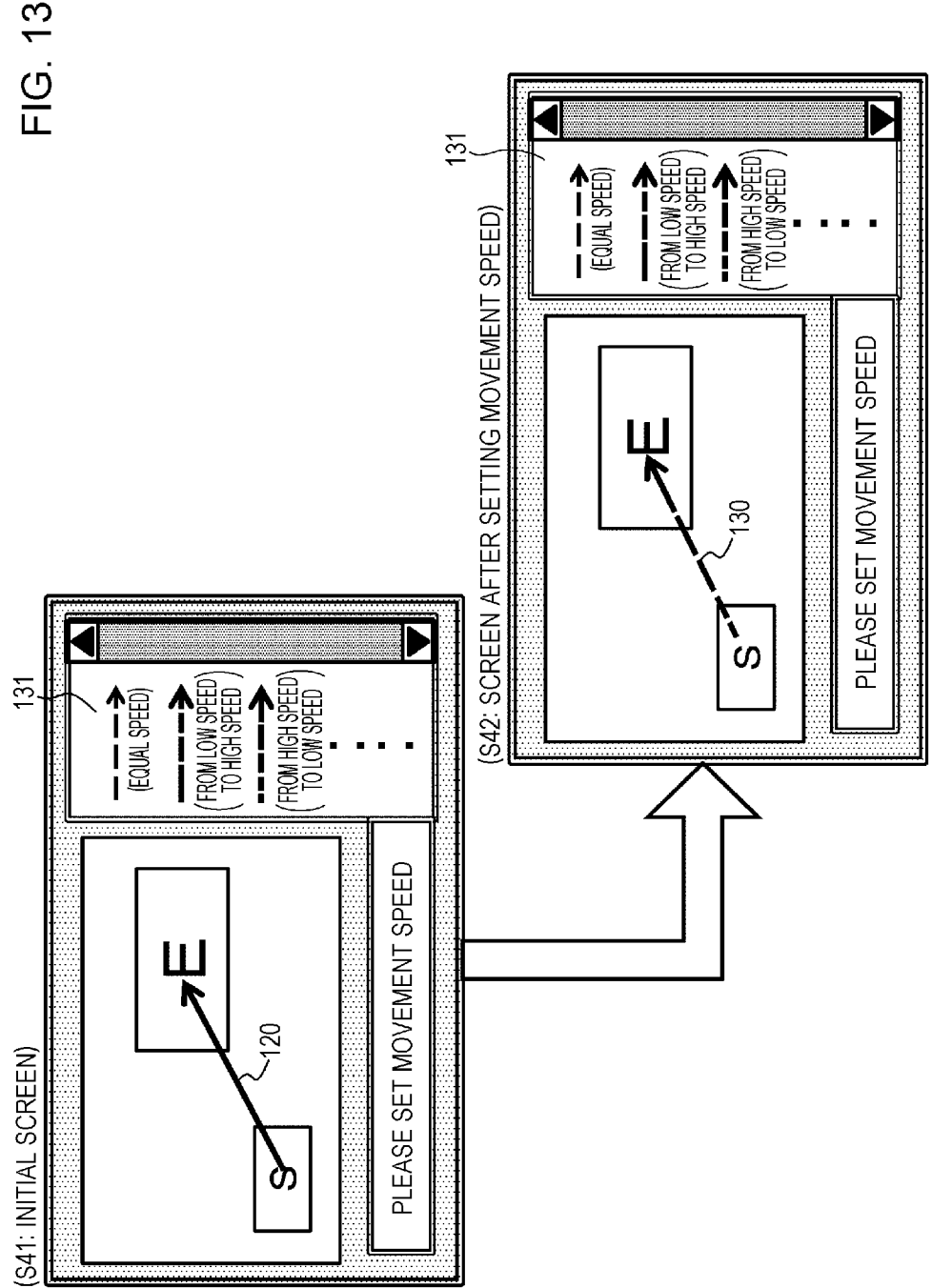
FIG. 13 is a diagram which describes an example of a specific sequence of the movement speed setting process.

FIG. 13 is a diagram which describes a screen transition in the process of setting the movement speed.

(S41: initial screen) is the initial screen of the display unit 21 when setting the movement speed.

Movement speed setting icons 131 are displayed on the display unit 21 of the imaging apparatus 10 in addition to the rectangular frames of the start frame S and the end frame E which are already set with respect to the through image, and the image display region in which the track setting line 120 is displayed.

A plurality of samples for setting a movement speed of each image frame which is photographed according to the track setting line 120 which connects the start frame S and the end frame E are displayed in the movement speed setting icons 131. That is, a plurality of samples of the movement speed setting line which can be selected by the user are displayed. The user can set a movement speed by selecting any one of the samples.

FIG. 13 illustrates three samples of the movement speed setting line.

(1) A movement speed setting line for setting uniform speed of which the length of each line of a dotted line is equal (2) A movement speed setting line for transitioning the movement speed from a low speed to high speed, of which the length of each line of a dotted line changes from being shortest at the left (3) A movement speed setting line for transitioning the movement speed from a high speed to low speed, of which the length of each line of a dotted line changes from being longest at the left These three samples are illustrated in FIG. 13.

The user can set the movement speed by performing a process of selecting and determining any one of these samples, for example.

FIG. 13 (S42: screen after setting movement speed) illustrates an example in which the user selects and determines a movement speed which transitions from a high speed to a low speed.

As illustrated in FIG. 13, a line which connects the start frame S and the end frame E is displayed by being changed from the track setting line 120 to the movement speed setting line 130.

When a recording process of the low speed photographing or the moving image photographing is started, a process of sequentially recording an image which is defined according to a track and a movement speed which are set by the user in a memory as a recording image is performed according to a control of the control unit of the imaging apparatus.

In addition, only three types of movement speed setting line are denoted in the movement speed setting icons 131 in FIG. 13, however, in addition to this, movement speed setting lines of various settings such as a transition of the movement speed of low speed→high speed→low speed, high speed→low speed→high speed, and the like, for example, are included in the samples.

Step S109

Subsequently, photographing of an image is started by proceeding to step S109 which is the last step of the flow illustrated in FIG. 5. In addition, the process of starting photographing is executed according to a photographing start operation by the user with respect to the shutter 12 or the input unit 22 of the imaging apparatus 10, a timer setting, or the like.

The control unit of the imaging apparatus executes processes of photographing of an image, cutout (trimming), and recording according to setting information which is set by the user according to the flow illustrated in FIG. 5. In addition, user setting information which is set by the user according to the flow in FIG. 5 is stored in the memory of the imaging apparatus 10, and the control unit of the imaging apparatus executes processes of image photographing, image cutout, and recording according to the user setting information which is stored in the memory.

For example, as described with reference to FIG. 12(2) previously, the processes of photographing the plurality of images from the start frame (S) 102 to the end frame (E) 103, and storing the images as a recording image in the memory by cutting out each image corresponding to the frame position and size which are set by the user from each photographed image are executed.

In addition, in the flow which is described with reference to FIG. 5, a processing example has been described in which positions and sizes of the two frames of the start frame and the end frame are determined, and the track and the movement speed between the two frames are set. However, in addition, there may be a configuration in which the user sets a position and size of a photographing frame between the two frames.

For example, the user determines positions and sizes of three frames of a start frame, one intermediate frame, and an end frame. In addition, the user determines a track and a movement speed of the start frame and the intermediate frame, and determines a track and a movement speed of the intermediate frame and the end frame. In this manner, when three or more frame positions and sizes are determined, and a track and movement speed between determined frames are set, it is possible to perform photographing corresponding to a more detailed control.

4. Regarding Setting Example of Photographed Image

As described above, it is possible to photograph and record the process between the start frame (S) and the end frame (E) as an image corresponding to the setting by the user, by performing setting corresponding to the flow which is described with reference to FIG. 5 before starting the low speed photographing or the moving image photographing.

A specific example of processes of photographing and recording of an image will be described with reference to FIGS. 14 and 15.

Figure 14:
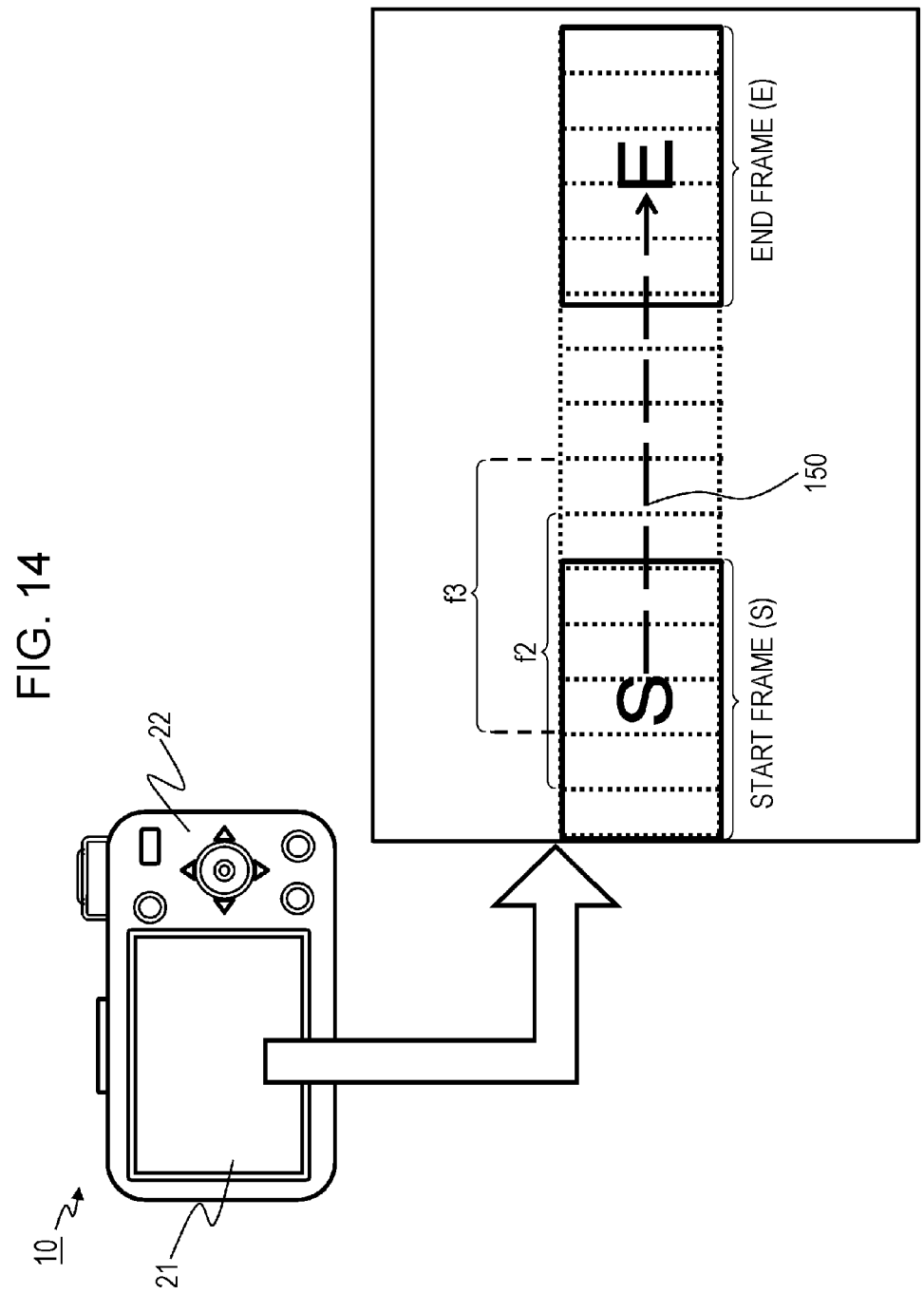
FIG. 14 is a diagram which describes a configuration example of a series of image frames which are photographed based on various setting information.

FIG. 14 is a diagram which illustrates one display example of the display unit 21 at a point of time in which all of processes of the flow illustrated in FIG. 5 are completed. In addition, dotted lines are complimentarily illustrated as additional information for denoting a position of each image frame which is stored in the memory as a recording image, and are not displayed in practice.

In the example illustrated in FIG. 14, the start frame (S) is set at a center portion of the left end, and the end frame (E) is set at a center portion of the right end. A track is a linear track from the start frame (S) to the end frame (E). A movement speed is set to a speed of moving at uniform speed from the start frame (S) to the end frame (E).

In the setting illustrated in FIG. 14, as illustrated in the figure using the dotted line, a recording image is generated at regular frame intervals of the start frame (S), a second frame (f2), a third frame (f3), . . . , and the end frame (E).

In the example, since image sizes of the start frame (S) and the end frame (E) are the same, all of the intermediate image frames which are photographed between the start frame and the end frame also have the same image size as that of the start frame (S) and the end frame (E).

Figure 15:
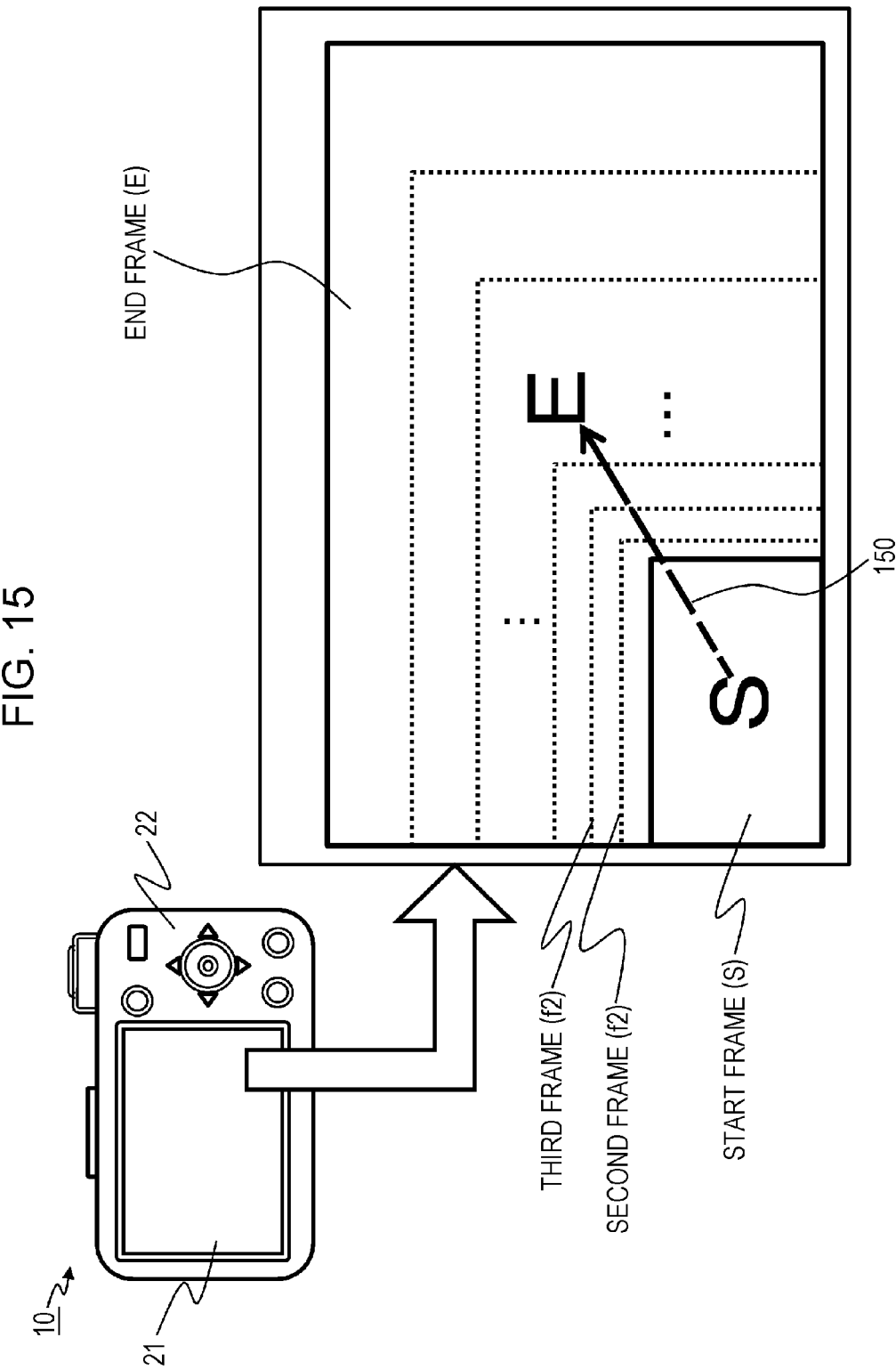
FIG. 15 is a diagram which describes a configuration example of the series of image frames which are photographed based on the various setting information.

FIG. 15 is an example in which a different setting from that in FIG. 14 is made. It is an example in which the start frame (S) is set on the lower left end, and the end frame (E) is set as approximately the entire image region. The track is a linear track from the start frame (S) to the end frame (E). The movement speed is set so as to gradually shift from a low speed to a high speed from the start frame (S) to the end frame (E).

In the setting illustrated in FIG. 15, like dotted lines which denote each image frame illustrated in the figure, positions of the second frame (f2) right after the start frame (S), and a recording image frame of the third frame (f3) are slightly deviated from the position of the start frame (S), however, the amount of deviation becomes large by approaching the end frame (E). The reason for this is that the movement speed changes from a low speed to a high speed.

In the example, the image sizes of the start frame (S) and the end frame (E) are different, and the image size of the end frame (E) is set to be larger than that of the start frame (S). Accordingly, an intermediate image frame which is photographed between the start frame and the end frame has an image size which is determined according to a separation distance between the start frame (S) and the end frame (E). The image size of each image frame is determined according to the calculating formula which is described with reference to FIG. 12 previously.

5. Regarding Process of Image Photographing and Recording According to Setting Information Two examples of image photographing and recording process have been described with reference to FIGS. 14 and 15, however, in the setting process corresponding to the flow in FIG. 5 which has been described previously, the user can perform various setting, and a photographing process corresponding to the setting is performed.

In addition, the following information is included in the setting information for setting which is performed according to the flow illustrated in FIG. 5.

(a) photographing period and number of images to be photographed
(b) position and size of start frame and end frame
(c) track between start frame and end frame
(d) movement speed between start frame and end frame These pieces of setting information are stored in the memory of the imaging apparatus, and the control unit of the imaging apparatus executes a photographing and recording process according to the setting information which is stored in the memory.

Figure 16:
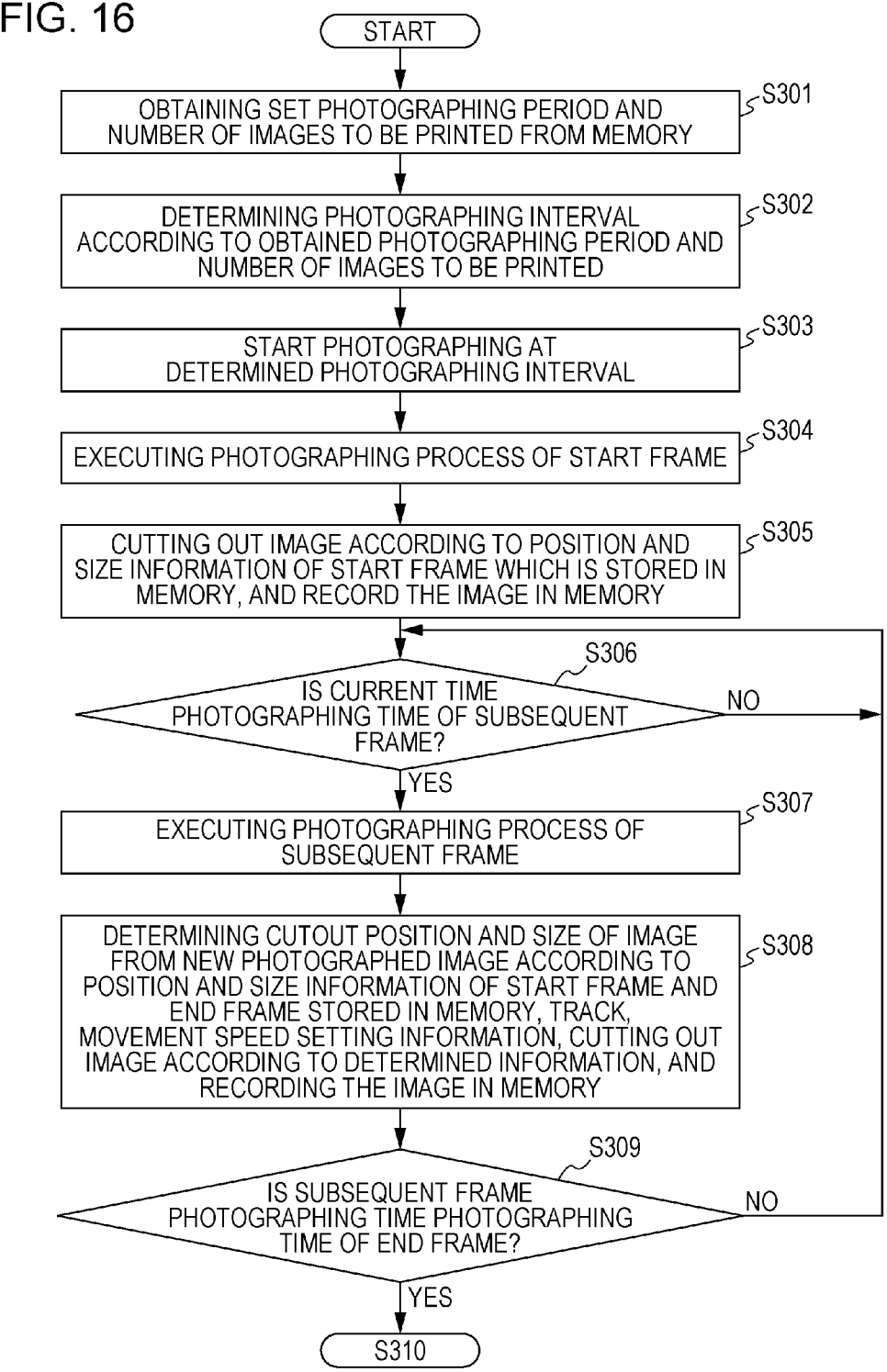
FIG. 16 is a diagram of a flowchart which describes sequences of image photographing and a recording process which are executed by the imaging apparatus based on the various setting information.
Figure 17:
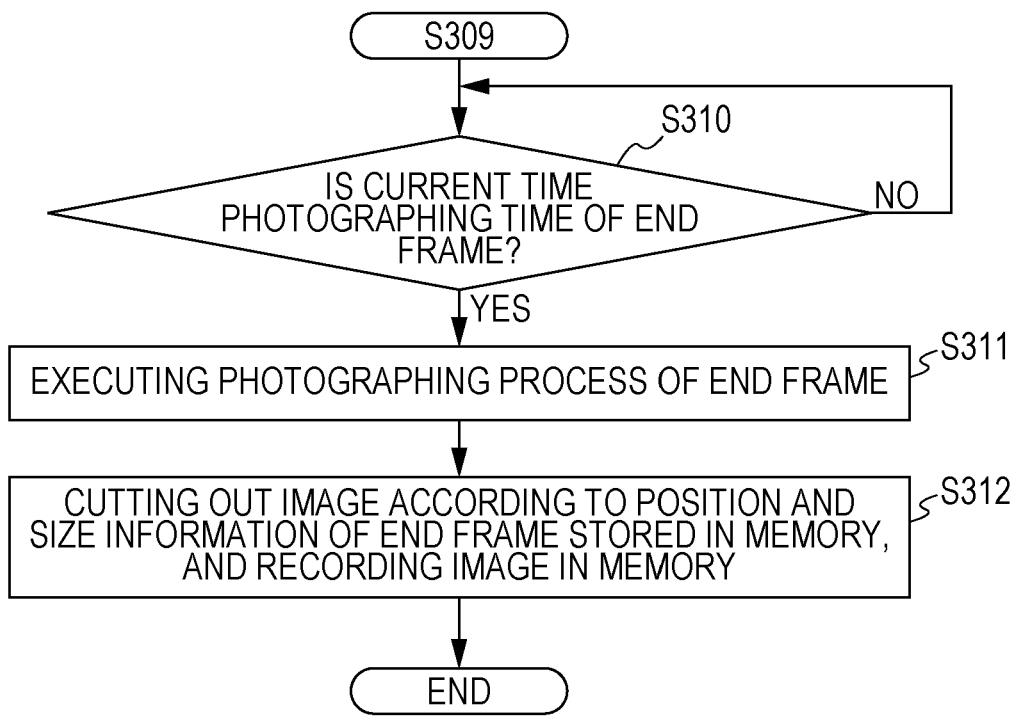
FIG. 17 is a diagram of a flowchart which describes the sequences of image photographing and the recording process which are executed by the imaging apparatus based on the various setting information.

Hereinafter, the image photographing and the sequence of the recording process which are executed by the imaging apparatus will be described with reference to flowcharts which are illustrated in FIGS. 16 and 17.

The flowcharts illustrated in FIGS. 16 and 17 are executed by the control unit of the imaging apparatus, or under the control of a digital signal processing unit (DSP). For example, a program which is stored in the memory of the imaging apparatus in advance is executed by the control unit which includes a processor having a function of executing the program, or by the digital signal processing unit (DSP), and processing corresponding to the flow is executed. In addition, in the process which will be described later, the control of the process is described as being executed in the control unit, as an example.

Hereinafter, processing in each step will be sequentially described.

Step S301

First, the control unit of the imaging apparatus obtains each piece of setting information of a photographing period, and the number of images to be photographed which is set according to the flow which has been described with reference to FIG. 5 from the memory.

Steps S302 and S303

Subsequently, the control unit determines a photographing interval of each image frame based on the obtained photographing period and the number of images to be photographed, and starts photographing.

In addition, a trigger of starting of photographing is a user operation, timer setting information, or the like.

Step S304

At the point of time of starting photographing, photographing of an image including a start frame is performed. In addition, an image to be photographed is not limited to an image in a region of the start frame 102 which has been described with reference to FIG. 6, or the like, for example, and is an image which is input through the lens, that is, an image corresponding to the entire photographed image 101 which is illustrated in FIG. 6(1).

Step S305

Subsequently, in step S305, cutout processing (trimming) of the start frame is executed in the image which is photographed in step S304 according to the position and size information of the start frame which is stored in the memory, and the cutout image is stored in the memory as a recording image.

Due to the processing, an image which is formed of only the region of the start frame (S) illustrated in FIG. 6(1), for example, is generated, and is recorded in the memory.

Step S306

After the recording process of the start frame, whether or not the current time is a photographing time of the subsequent frame is determined in step S306. The photographing time of the subsequent frame is a time which is defined by a photographing interval which is calculated in step S302.

When it is determined that the current time is a photographing time of the subsequent frame, the process proceeds to step S307.

Step S307

In step S307, a process of photographing the subsequent frame is performed. In addition, an image to be photographed is an image which is input through the lens, similarly to the photographing of the start frame in the previous step S304, that is, an image corresponding to the entire photographed image 101 in FIG. 6(1).

Step S308

Subsequently, in step S308, processes of determining a cutout position and a size of an image from a new photographed image according to the position and size information of the start frame and end frame, track setting information, and movement speed setting information which are stored in the memory, cutting out an image according to the determined information, and recording the image in the memory are performed.

The process of image cutting out is image cutout processing which is executed by performing a process corresponding to a determining process of a position and size of the frame n (Fn) which has been described with reference to FIG. 12 previously, for example.

Step S309

Subsequently, in step S309, whether or not the subsequent photographing time is a photographing time of the end frame is determined. The photographing time of the end frame is a time defined by the photographing interval which is calculated in step S302.

When the subsequent photographing time is not the photographing time of the end frame, the process returns to step S306, steps S306 to S308 are repeated, and processes of photographing of intermediate frames between the start frame and end frame, cutting out, and recording are continued.

When it is determined that the subsequent frame photographing time is the photographing time of the end frame in step S309, the process proceeds to step S310.

Step S310

In step S310, whether or not the current time is a photographing time of the end frame is determined.

When it is determined that the current time is the photographing time of the end frame, the process proceeds to step S311.

Step S311

In step S311, photographing of an image including the end frame is performed. In addition, an image to be photographed is not limited to the image in the region of the end frame 103 which has been described with reference to FIG. 6, or the like, for example, and is an image which is input through the lens, that is, the image corresponding to the entire photographed image 101 which is illustrated in FIG. 6(1).

Step S312

Subsequently, in step S312, cutout processing (trimming) of the end frame is performed in the image which is photographed in step S311 according to the position and size information of the end frame which is stored in the memory, and the cutout image is recorded in the memory as a recording image.

According to the above described processes, the plurality of images are cut out from the photographed image, and are stored in the memory from the start frame to the end frame.

It is possible to display a series of images of which photographing angles of view are different as an HD image, by displaying the series of cutout images on the display device 50 which is illustrated in FIGS. 2A and 2B, that is, the display device 50 which can display the HD image, for example.

That is, since the plurality of image frames which are photographed using the low speed photographing or the moving image photographing are configured by image frames with positions and sizes which are set by a user, the image frames can be recorded as images with different positions and different zooming corresponding to the user setting, and can be displayed. In addition, a difference in frame size may be reflected as a difference in zoom setting.

In addition, when all frame sizes are set to be equal to or greater than 1920×1080 pixels, display as an HD image in the HD display device is possible, and display as a high quality image is possible without deteriorating the image quality.

The processing which has been described with reference to FIGS. 16 and 17 is real time processing in which image cutout processing in a photographed image is performed every time one image is photographed while performing a process of image photographing, and recording in the memory is performed.

This may be a configuration of executing, for example, a process in which a plurality of image frames are stored in the memory by executing normal moving image photographing or the low speed photographing, photographed image data which is stored in the memory is read thereafter, and is restored in the memory by sequentially performing image cutout from each image, that is, batch processing, not such real time processing.

A processing sequence when performing such a process will be described with reference to a flowchart illustrated in FIG. 18.

Figure 18:
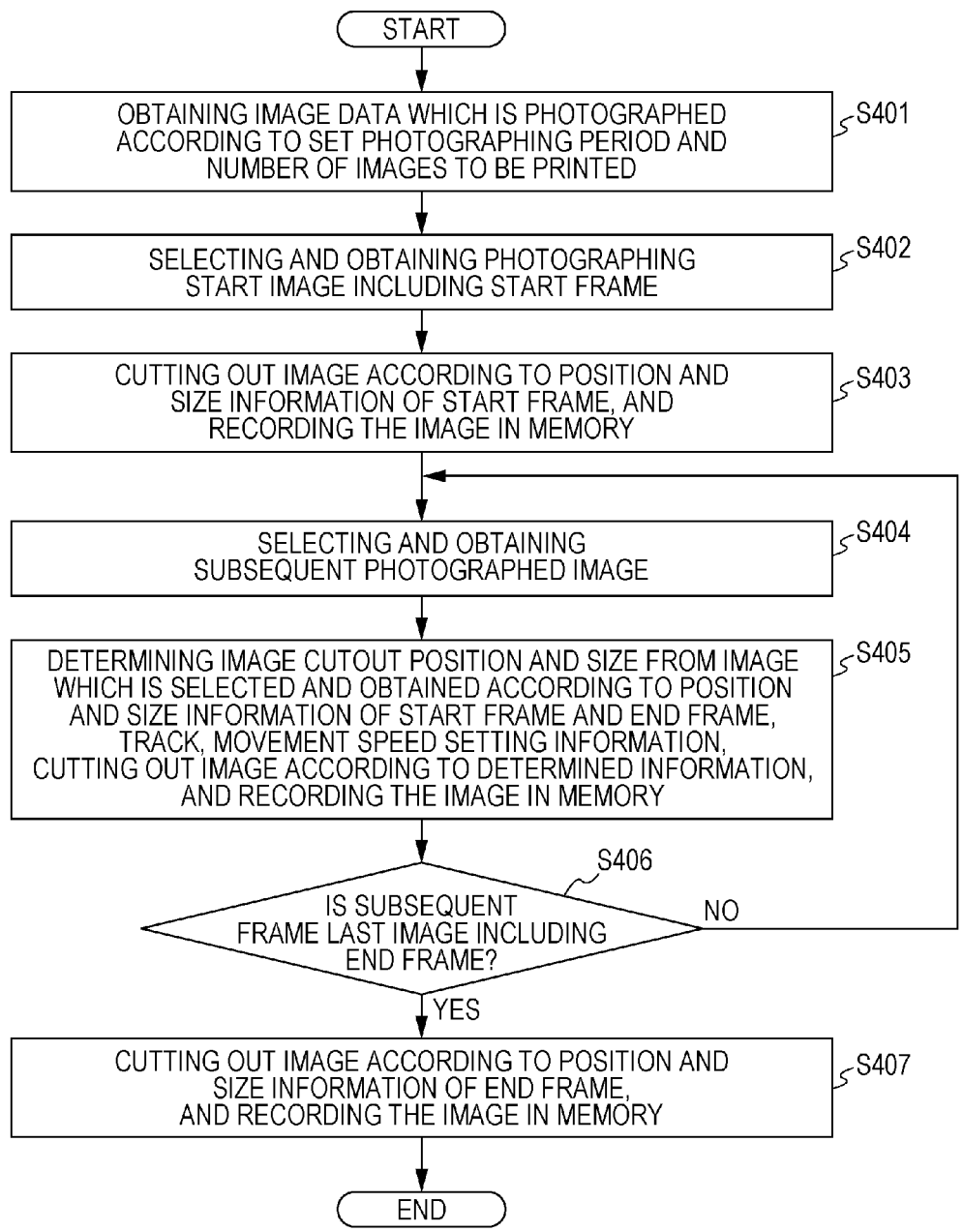
FIG. 18 is a diagram of a flowchart which describes sequences of image cutout processing and a recording process with respect to an image photographed based on the various setting information.

In addition, processes according to the flowchart illustrated in FIG. 18 are processes without the imaging process, and can be executed in an image processing device such as a personal computer, for example, without being limited to the imaging apparatus.

That is, the processes can be executed in various devices which can execute image processing by reading photographed image data from an external device, or a memory.

The flow illustrated in FIG. 18 is executed under a control of the control unit of the imaging apparatus or the image processing device, or a digital signal processing unit (DSP). For example, a control unit which includes a processor which has a function of executing a program, or the digital signal processing unit (DSP) executes a program which is stored in a memory of the imaging apparatus or image processing device in advance, and processes corresponding to the flow are executed.

Hereinafter, processing in each step will be sequentially described.

Step S401

First, in step S401, an image which is a processing target is input from a memory, an external device, or the like.

The image as the processing target is, for example, data of a moving image, or image data of low speed photographing, and is an image which is photographed by executing the process which has been described with reference to the flowchart in FIG. 5 previously.

Step S402

In step S402, a photographed image including a start frame is obtained. In addition, the obtained image is not limited to the image in the region of the start frame 102 which has been described with reference to FIG. 6, or the like, for example, and is a photographed image, that is, an image corresponding to the entire photographed image 101 illustrated in FIG. 6(1).

Step S403

Subsequently, in step S403, cutout processing (trimming) of the start frame is performed in the image obtained in step S402 according to the position and size information of the start frame which is stored in the memory, and the cutout image is stored in the memory as a recording image.

Due to the processing, an image which is formed of only the region of the start frame (S) illustrated in FIG. 6(1), for example, is generated, and is recorded in the memory.

Step S404

Subsequently, in step S404, the subsequent photographed image is obtained.

Step S405

Subsequently, in step S405, an image cutout position in a new obtained image, and a size thereof are determined according to position and size information of the start frame and end frame which are stored in the memory, track setting information, and movement speed setting information, and processes of cutting out an image according to the determined information, and recording the image are executed.

The image cutout processing is image cutout processing which is executed by performing a process corresponding to a determining process of a position and size of the frame n (Fn) which has been described with reference to FIG. 12 previously, for example.

Step S406

Subsequently, in step S406, whether or not the subsequent processing target image is an image including the end frame is determined. When the subsequent processing target image is not the image including the end frame, the process returns to step S404, processes in steps S404 and S405 are repeated, intermediate frames are cut out, and the recording process is continued.

When it is determined that the subsequent processing target image is the image including the end frame in step S406, the process proceeds to step S407.

Step S407

In step S407, the end frame is cut out, and storage processing is performed. Cut out processing (trimming) of the end frame from the photographed image including the end frame is performed according to the position and size information of the end frame which is stored in the memory, and the cutout image is recorded in the memory as a recording image.

Due to these processes, processing of recording a series of cutout images which has been described with reference to FIG. 12(2), for example, in the memory as a recording image is completed from the start frame to the end frame.

It is possible to display a series of images of which photographing angles of view are different as an HD image, by displaying the series of cutout images on the display device 50 which is illustrated in FIGS. 2A and 2B, that is, the display device 50 which can display the HD image, for example. As described above, since the plurality of image frames which are photographed using the low speed photographing or the moving image photographing are configured by an image frame of which a position and size correspond to a user setting, it is possible to record and display the image frame as an image of which a position and zoom setting are different corresponding to the user setting. When all settings of the frame size are set to be equal to or greater than 1920×1080, it is possible to display the image as an HD image in the HD display device, and it is possible to display the image as a high quality image without deteriorating the image quality.

6. Regarding Configuration Example of Hardware of Imaging Apparatus and Image Processing Device Subsequently, one configuration example of hardware of the imaging apparatus and the image processing device which execute processes according to the above described example will be described.

Figure 19:
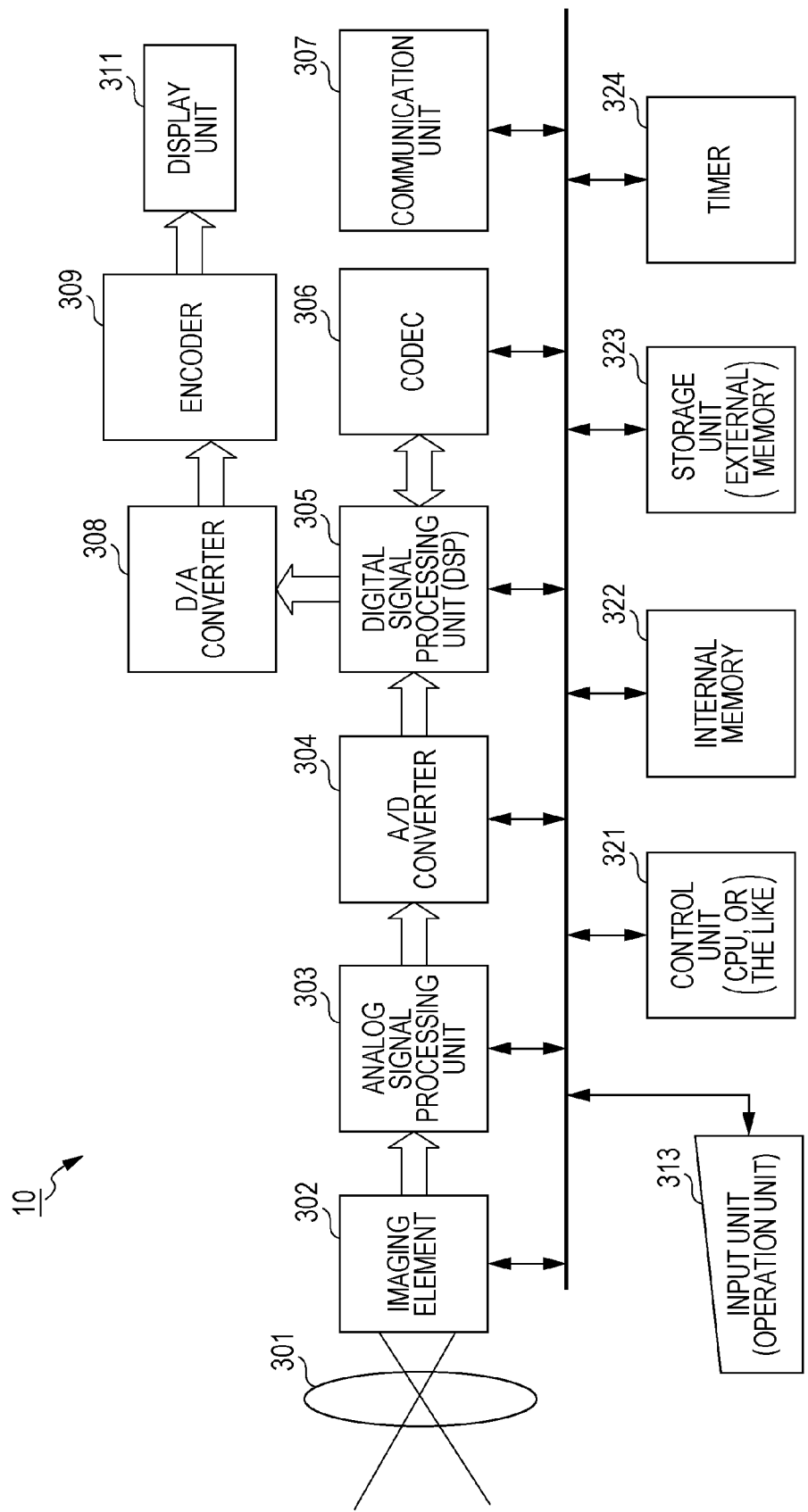
FIG. 19 is a diagram which describes an example of a hardware configuration of the imaging apparatus.

FIG. 19 is a diagram which illustrates a configuration example of hardware of the imaging apparatus of the present disclosure.

As illustrated in FIG. 19, the imaging apparatus 10 includes a lens 301 as an imaging unit, an imaging element 302, an analog signal processing unit 303, an A/D conversion unit 304, a digital signal processing unit (DSP) 305, a codec 306, a communication unit 307, a D/A conversion unit 308, an encoder 309, a display unit 311, an input unit 313, a control unit 321, an internal memory 322, a storage unit (external memory) 323, and a timer 324.

The input unit 313 includes, for example, an operation unit for inputting various setting information which has been described with reference to the flow in FIG. 5, or the like, in addition to a shutter in a main body of a camera. The digital signal processing unit 305 includes a processor for signal processing and a RAM for images, and the processor for signal processing performs image processing which is programmed in advance with respect to image data which is stored in the RAM for images.

Input light which reaches the imaging element 302 by passing through an optical system such as the lens 301 reaches each light receiving element on the imaging surface first, is converted into an electric signal due to photoelectric conversion in the light receiving element, is subjected to processing of noise reduction, or the like, using the analog signal processing unit 303, and is converted into a digital signal in the A/D conversion unit 304.

The digital signal which is generated in the A/D conversion unit 304 is input to the digital signal processing unit (DSP) 305. The digital signal processing unit (DSP) 305 executes image processing to which various image processing parameters are applied. In addition, the processed image is converted into an analog signal using the D/A conversion unit 308, is subjected to encoding using the encoder 309, and then is displayed on the display unit 311.

The display unit 311 corresponds to the display unit 21 of the imaging apparatus 10 in FIG. 1.

A user performs setting of positions and sizes of a start frame (S) and an end frame (E), setting of a track, setting of a movement speed, or the like, with reference to a display image (through image) which is displayed on the display unit 311.

The imaging process is performed under a control of the control unit 321. For example, when low speed photographing is performed, setting information such as a photographing period and the number of images to be photographed which are set in advance is read from the internal memory 322, and image photographing is sequentially performed according to the setting information.

When image photographing is started, processing with respect to the photographing image is performed in the digital signal processing unit (DSP) 305. The processed image is compressed in the codec 306, and is recorded in the storage unit (external memory) 323, or the like, as the final recording data thereafter.

In the digital signal processing unit (DSP) 305, for example, processing of cutting out an image frame from a photographed image, or the like, which has been described with reference to FIGS. 16 to 18 previously is performed. Setting information, or the like, which is necessary in the processing is recorded in the internal memory 322, or a memory in the digital signal processing unit 305.

The input unit 313 is configured of an input unit for setting a photographing mode, a shutter, an input unit for various setting information which has been described with reference to the flow in FIG. 5, or the like. In addition, when including a touch panel display unit as described above, the display unit also functions as the input unit.

The communication unit 307 includes each of wired or wireless interfaces which perform inputting or outputting of an image, parameters, or the like, with respect to the external device.

The control unit 321 performs various controls such as obtaining of setting information which is applied to a photographing process, a storing process, a photographing control process, and image processing of a photographed image. For example, the control unit performs a processing control according to each flow which has been described previously, for example. In addition, a program for a processing control is stored in the internal memory 322, or the storage unit 323.

User setting information, or the like, is stored in the internal memory 322. The storage unit 323 is configured of a medium, or the like, such as a flash memory, for example, and is used when storing a photographed image, parameters, a program, or the like.

The timer 324 is used when measuring a photographing start time, a photographing interval of each image, or the like.

Subsequently, a configuration example of hardware of an image processing device which does not include an imaging unit will be described.

FIG. 20 is a diagram which illustrates a configuration example of hardware of an image processing device 700 such as a personal computer, for example. The image processing device 700 performs processes which have been described previously with reference to FIG. 18, for example.

A control unit (CPU: Central Processing Unit) 701 functions as a data processing unit which executes various processes according to a program which is stored in a memory (ROM: Read Only Memory) 702, or a storage unit 708. For example, the control unit executes processes corresponding to the sequence which has been described previously with reference to FIG. 18. A program or data, parameters, or the like, which is executed by the control unit 701 is stored in a memory (RAM: Random Access Memory) 703. This control unit (CPU) 701, memory (ROM) 702, and memory (RAM) 703 are connected to each other using a bus 704.

The control unit (CPU) 701 is connected to an input-output interface 705 through the bus 704, and an input unit 706 which is configured of various switches, a keyboard, a mouse, a microphone, or the like, and an output unit 707 which is configured of a display, a speaker, or the like, are connected to the input-output interface 705. The control unit (CPU) 701 executes various processes corresponding to a command which is input from the input unit 706, and outputs a processing result to the output unit 707, for example.

A storage unit 708 which is connected to the input-output interface 705 is configured of a hard disk, or the like, for example, and stores a program which is executed by the control unit (CPU) 701, or various data items. A communication unit 709 communicates with an external device through a network such as the Internet, or a local area network.

A drive 710 which is connected to the input-output interface 705 drives a removable medium 711 such as a semiconductor memory such as a magnetic disk, an optical disc, a magneto-optical disc, a memory card, or the like, and obtains various data items such as recorded image data, various setting information, and parameters. For example, image cutout processing, or the like, is performed with respect to obtained image data, for example, according to a program which is executed by the control unit (CPU) 701.

7. Conclusions for Configuration of Present Disclosure

Hitherto, examples of the present disclosure have been described in detail with reference to specific examples. However, it is self-evident that a person skilled in the art could perform a modification or substitutions to the example without departing from the scope of the present disclosure. That is, the present disclosure has been disclosed as examples, and should not to be limitedly interpreted. In order to determine the scope of the present disclosure, claims should be taken into consideration.

In addition, the technology which is disclosed in the specification can be configured as follows.

(1) An imaging apparatus which includes a control unit which displays cutout positions of a start frame and an end frame on an object image which is displayed on a display unit, and sets frame setting information including the cutout positions of the start frame and the end frame according to user input information, in which the control unit determines a cutout region of an image frame according to the frame setting information from each of a plurality of photographed images which are photographed continuously or intermittently, and executes image cutout processing according to determined information.

(2) The imaging apparatus which is described in (1), in which the frame setting information includes position and size information of the start frame and the end frame, and the control unit determines a cutout region of an image frame with respect to each of photographed images by applying the position and size information of the start frame and the end frame, and executes image cutout processing according to determined information.

(3) The imaging apparatus which is described in (1) or (2), in which the frame setting information includes track information between the start frame and the end frame, and the control unit determines a cutout region of an image frame with respect to each of the photographed images by applying the track information between the start frame and the end frame, and executes image cutout processing according to determined information.

(4) The imaging apparatus which is described in any one of (1) to (3), in which the frame setting information includes movement speed information between the start frame and the end frame, and the control unit determines a cutout region in an image frame with respect to each of photographed images by applying the movement speed information between the start frame and the end frame, and executes image cutout processing according to determined information.

(5) The imaging apparatus which is described in any one of (1) to (4), in which the control unit executes image cutout processing according to the frame setting information in each of the photographed images, and stores the cutout image in a memory.

(6) The imaging apparatus which is described in any one of (1) to (5), in which the control unit executes image cutout processing in each of photographed images in each photographing process of images which are photographed continuously or intermittently, and executes real time processing of storing the cutout images in the memory.

(7) The imaging apparatus which is described in any one of (1) to (5), in which the control unit performs batch processing in which the images stored in the memory after completing the image photographing process which is continuous or intermittent are sequentially read, image cutout processing in each photographed image is executed, and the cutout images are restored in the memory.

(8) The imaging apparatus which is described in any one of (1) to (7), in which setting information which is input through an input unit is stored in the memory, and the control unit executes image cutout processing in each photographed image according to the setting information which is stored in the memory.

(9) The imaging apparatus which is described in any one of (1) to (8), in which the control unit executes information display processing in which frame setting at an arbitrary photographing timing is possible by displaying a time line which denotes a photographing timing of an image on the display unit, and setting an instruction mark on the time line.

(10) The imaging apparatus which is described in (3), in which the control unit displays a plurality of samples of tracks which can be set between the start frame and the end frame on the display unit, and executes information display processing in which a specific track can be selected and set from the displayed plurality of samples.

(11) The imaging apparatus which is described in (4), in which the control unit displays a plurality of samples of movement speed which can be set between the start frame and the end frame on the display unit, and executes information display processing in which a specific movement speed can be selected and set from the displayed plurality of samples.

(12) The imaging apparatus which is described in any one of (1) to (11), in which the input unit inputs a photographing period and number of images to be photographed as photographing information of low speed photographing, and the control unit sequentially photographs a plurality of images according to a photographing interval which is calculated using the photographing period and the number of images to be photographed, and executes image cutout processing according to the frame setting information in each of the photographed images.

(13) An image processing device which includes a control unit which cuts out an image in a specific region from each of a plurality of images which are photographed continuously or intermittently, in which the control unit executes cutout of an image frame from each photographed image by applying start frame setting information which denotes an image cutout position in a first image, and end frame setting information which denotes an image cutout position in a last image.

(14) An image processing method which is executed in an imaging apparatus by a control unit, the method including displaying cutout positions of a start frame and an end frame on an object image which is displayed on a display unit according to information input through an input unit, and setting frame setting information including the cutout positions of the start frame and the end frame, and determining a cutout region of an image frame according to the frame setting information with respect to each of photographed images which are continuous or intermittent, and executing image cutout processing according to determined information.

(15) A program which causes image processing to be executed in an imaging apparatus, the program causing a control unit to execute displaying cutout positions of a start frame and an end frame on an object image which is displayed on a display unit according to input information through an input unit, setting frame setting information including the cutout positions of the start frame and the end frame, determining a cutout region of an image frame according to the frame setting information with respect to each of photographed images which are continuous or intermittent, and performing image cutout processing according to determined information.

In addition, the series of processes which are described in the specification can be executed using hardware, software, or a combination of both. When the processes are executed using software, it is possible to execute the processes by installing a program in which a processing sequence is recorded in a memory in a computer which is incorporated in exclusive hardware, or by installing the program in a general-purpose computer which can execute various processes. For example, the program can be recorded in advance in a recording medium. It is possible to receive the program through a network such as a Local Area Network (LAN), the Internet, and install in a recording medium such as an embedded hard disk, in addition to installing in a computer from a recording medium.

In addition, various processes which are described in the specification can be executed not only in time sequence according to the description, and can also be executed in parallel or individually according to a processing capacity of a device which executes the processing, or as necessary. In addition, the system in the specification has a logical collective configuration of a plurality of devices, and is not limited to a configuration in which devices of each configuration are placed in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a controller which displays cutout positions of a start frame and an end frame on an object image which is displayed on a display, and sets frame setting information including the cutout positions of the start frame and the end frame according to user input information,
wherein the controller determines a cutout region of an image frame according to the frame setting information from each of a plurality of photographed images which are photographed continuously or intermittently, and executes image cutout processing according to determined information.

2. The imaging apparatus according to claim 1,
wherein the frame setting information includes position and size information of the start frame and the end frame, and
wherein the controller determines a cutout region of an image frame with respect to each of photographed images by applying the position and size information of the start frame and the end frame, and executes image cutout processing according to determined information.

3. The imaging apparatus according to claim 2,
wherein the frame setting information includes track information between the start frame and the end frame, and
wherein the controller determines a cutout region of an image frame with respect to each of the photographed images by applying the track information between the start frame and the end frame, and executes image cutout processing according to determined information.

4. The imaging apparatus according to claim 3,
wherein the frame setting information includes movement speed information between the start frame and the end frame, and
the controller determines a cutout region in an image frame with respect to each of photographed images by applying the movement speed information between the start frame and the end frame, and executes image cutout processing according to determined information.

5. The imaging apparatus according to claim 1,
wherein the controller executes image cutout processing according to the frame setting information in each of the photographed images, and stores the cutout image in a memory.

6. The imaging apparatus according to claim 1,
wherein the controller executes image cutout processing in each of photographed images in each photographing process of images which are photographed continuously or intermittently, and executes real time processing of storing the cutout images in a memory.

7. The imaging apparatus according to claim 1,
wherein the controller performs batch processing in which the images stored in the memory after completing the image photographing process which is continuous or intermittent are sequentially read, image cutout processing in each photographed image is executed, and the cutout images are restored in the memory.

8. The imaging apparatus according to claim 1,
wherein setting information which is input through an input unit is stored in the memory, and
the controller executes image cutout processing in each photographed image according to the setting information which is stored in the memory.

9. The imaging apparatus according to claim 1,
wherein the controller executes information display processing in which frame setting at an arbitrary photographing timing is possible by displaying a time line which denotes a photographing timing of an image on the display, and setting an instruction mark on the time line.

10. The imaging apparatus according to claim 3,
wherein the controller displays a plurality of samples of tracks which can be set between the start frame and the end frame on the display, and executes information display processing in which a specific track can be selected and set from the displayed plurality of samples.

11. The imaging apparatus according to claim 4,
wherein the controller displays a plurality of samples of movement speed which can be set between the start frame and the end frame on the display, and executes information display processing in which a specific movement speed can be selected and set from the displayed plurality of samples.

12. The imaging apparatus according to claim 1,
wherein the input unit inputs a photographing period and number of images to be photographed as photographing information of low speed photographing, and
wherein the controller sequentially photographs a plurality of images according to a photographing interval which is calculated using the photographing period and the number of images to be photographed, and executes image cutout processing according to the frame setting information in each of the photographed images.

13. An image processing device comprising:
a controller which cuts out an image in a specific region from each of a plurality of images which are photographed continuously or intermittently,
wherein the controller executes cutout of an image frame from each photographed image by applying start frame setting information which denotes an image cutout position in a first image, and end frame setting information which denotes an image cutout position in a last image.

14. An image processing method which is executed in an imaging apparatus by a controller, the method comprising:
displaying cutout positions of a start frame and an end frame on an object image which is displayed on a display according to information input through an input unit, and setting frame setting information including the cutout positions of the start frame and the end frame; and
determining a cutout region of an image frame according to the frame setting information with respect to each of photographed images which are continuous or intermittent, and executing image cutout processing according to determined information.

15. A non-transitory computer-readable medium storing thereon instructions that, when executed by a controller of an imaging apparatus, cause the imaging apparatus to execute operations comprising:
displaying cutout positions of a start frame and an end frame on an object image which is displayed on a display according to information input through an input unit, and setting frame setting information including the cutout positions of the start frame and the end frame; and
determining a cutout region of an image frame according to the frame setting information with respect to each of photographed images which are continuous or intermittent, and performing image cutout processing according to determined information.

* * * * *